(12) United States Patent  
Fiorentino

(10) Patent No.: US 8,635,116 B2  
(45) Date of Patent: **\*Jan. 21, 2014**

(54) SYSTEM AND METHOD FOR EXHIBITING AT LEAST VISUAL CONTENT IN ONE OR MORE PHYSICAL RETAIL STORES

(75) Inventor: Gilbert Fiorentino, Miami, FL (US)

(73) Assignee: Tigerdirect, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/612,324

(22) Filed: Sep. 12, 2012

(65) Prior Publication Data

US 2013/0006819 A1     Jan. 3, 2013

Related U.S. Application Data

(63) Continuation of application No. 12/540,150, filed on Aug. 12, 2009, now Pat. No. 8,321,292.

(60) Provisional application No. 61/088,290, filed on Aug. 12, 2008, provisional application No. 61/188,961, filed on Aug. 14, 2008, provisional application No. 61/109,095, filed on Oct. 28, 2008.

(51) Int. Cl.  
*G06Q 30/00* (2012.01)

(52) U.S. Cl.  
USPC ........... 705/26.1; 705/27.1; 705/28; 705/346; 235/383; 709/203; 707/E17.113

(58) Field of Classification Search  
USPC ................ 705/26.1, 27.1, 28, 346; 709/203; 707/E17.113; 235/383  
See application file for complete search history.

(56) References Cited

U.S. PATENT DOCUMENTS

| | | | |
|---|---|---|---|
| 4,962,466 A | 10/1990 | Revesz et al. | |
| 5,392,066 A | 2/1995 | Fisher et al. | |
| 5,761,601 A | 6/1998 | Nemirofsky et al. | |
| 6,026,376 A * | 2/2000 | Kenney | 705/26.61 |
| 6,553,404 B2 | 4/2003 | Stern | |
| 6,591,247 B2 | 7/2003 | Stern | |
| 7,010,498 B1 | 3/2006 | Berstis | |
| 7,309,009 B2 | 12/2007 | Singer-Harter | |
| 7,516,094 B2 | 4/2009 | Perkowski | |
| 8,260,687 B2 * | 9/2012 | Chang et al. | 705/26.8 |
| 2001/0028301 A1 | 10/2001 | Geiger et al. | |

(Continued)

OTHER PUBLICATIONS

Official Action issued in U.S. Appl. No. 12/540,150 dated May 24, 2012.

(Continued)

*Primary Examiner* — Yogesh C Garg  
(74) *Attorney, Agent, or Firm* — Greenberg Traurig, LLP

(57) ABSTRACT

One embodiment of the present invention is directed to a system for exhibiting at least visual content in one or more physical retail stores. Another embodiment of the present invention is directed to a method for exhibiting at least visual content in one or more physical retail stores. Another embodiment of the present invention is directed to a programmed computer for exhibiting at least visual content in one or more physical retail stores. Another embodiment of the present invention is directed to a computer readable medium for exhibiting at least visual content in one or more physical retail stores. In one example, the visual content may comprise advertising and/or operating specifications and/or performance specifications and/or dimensions and/or price displayed on a television, a computer monitor, a laptop computer display, a notebook computer display and/or a netbook computer display.

15 Claims, 13 Drawing Sheets

(56) References Cited

U.S. PATENT DOCUMENTS

| | | | |
|---|---|---|---|
| 2001/0032122 A1 | 10/2001 | Hankla | |
| 2002/0069113 A1 | 6/2002 | Stern | |
| 2002/0091593 A1 | 7/2002 | Fowler | |
| 2002/0147642 A1 | 10/2002 | Avallone et al. | |
| 2002/0178013 A1 | 11/2002 | Hoffman et al. | |
| 2003/0014423 A1* | 1/2003 | Chuah et al. | 707/102 |
| 2003/0191688 A1 | 10/2003 | Prince, III et al. | |
| 2003/0216958 A1 | 11/2003 | Register et al. | |
| 2004/0103031 A1 | 5/2004 | Weinschenk | |
| 2004/0128198 A1 | 7/2004 | Register et al. | |
| 2004/0245332 A1 | 12/2004 | Silverbrook et al. | |
| 2005/0148377 A1* | 7/2005 | Goldberg et al. | 463/12 |
| 2006/0085268 A1 | 4/2006 | Imendorf et al. | |
| 2006/0149632 A1 | 7/2006 | Register et al. | |
| 2006/0283941 A1* | 12/2006 | Singer-Harter | 235/383 |
| 2007/0278299 A1 | 12/2007 | Overhultz et al. | |
| 2008/0087725 A1 | 4/2008 | Liu | |
| 2008/0255957 A1* | 10/2008 | Erdem et al. | 705/26 |
| 2008/0301102 A1 | 12/2008 | Liang | |
| 2009/0222424 A1* | 9/2009 | Van | 707/3 |
| 2010/0179885 A1 | 7/2010 | Fiorentino | |

OTHER PUBLICATIONS

Official Action issued in U.S. Appl. No. 12/540,150, dated Nov. 10, 2011.

Navori—What's New in Version 5" pamphlet (18 pgs): Navori SA, Lausanne, Switzerland.

Navori Controller 5" pamphlet (4pgs): Navori International SA, Lausanne, Switzerland.

"Navori Server 5—Enterprizer Edition" pamphlet (4 pgs); Navori International SA, Lausanne, Switzerland.

"Navori Player 5" pamphlet (2 pgs); Navori International SA, Lausanne, Switzerland.

"Navori Server 5 Standard Edition" pamphlet (4 pgs); Navori International SA, Lausanne, Switzerland.

Promo << @Retail << Tuning In; posted Jan. 1, 2008 12:00 PM, Amy Johannes (5 pgs).

Internet Retailer: E-Business Strategies for Merchants & Catalogers; Fujitsu, Inabled Online Corp. Entice Retail Store Customers with ATMs, Big Screens and Digital News; Press Release from Jan. 16, 2002 (2 pgs) Copyright (c) 2009, Vertical Web Media.

WireSpring Technologies: Hardware, Software and Expert Advise for Digital Signage and Kiosks: Retail TV & In-Store Television Networks: The Business and Technology Behind Place-Based Broadcast Networks in Retail Stores (1 pg) Copyright (c) 2000-2008 WireSpring Technologies, Inc.

MMS Multi-Media Solutions; Navori Tycoon Network (4 pgs); (c) 2008 Multi-Media Solutions, Inc. http://www.digitalsignage-use.com/navori/index.php.

Navori International: Navori Server V5—Enterprise Edition (4 pgs) http://www.navori.com/prod_server_EE.html.

Navori International SA: Navori Player V5 (3 pgs) http://www.navori.com/prod_navori_player.html.

* cited by examiner

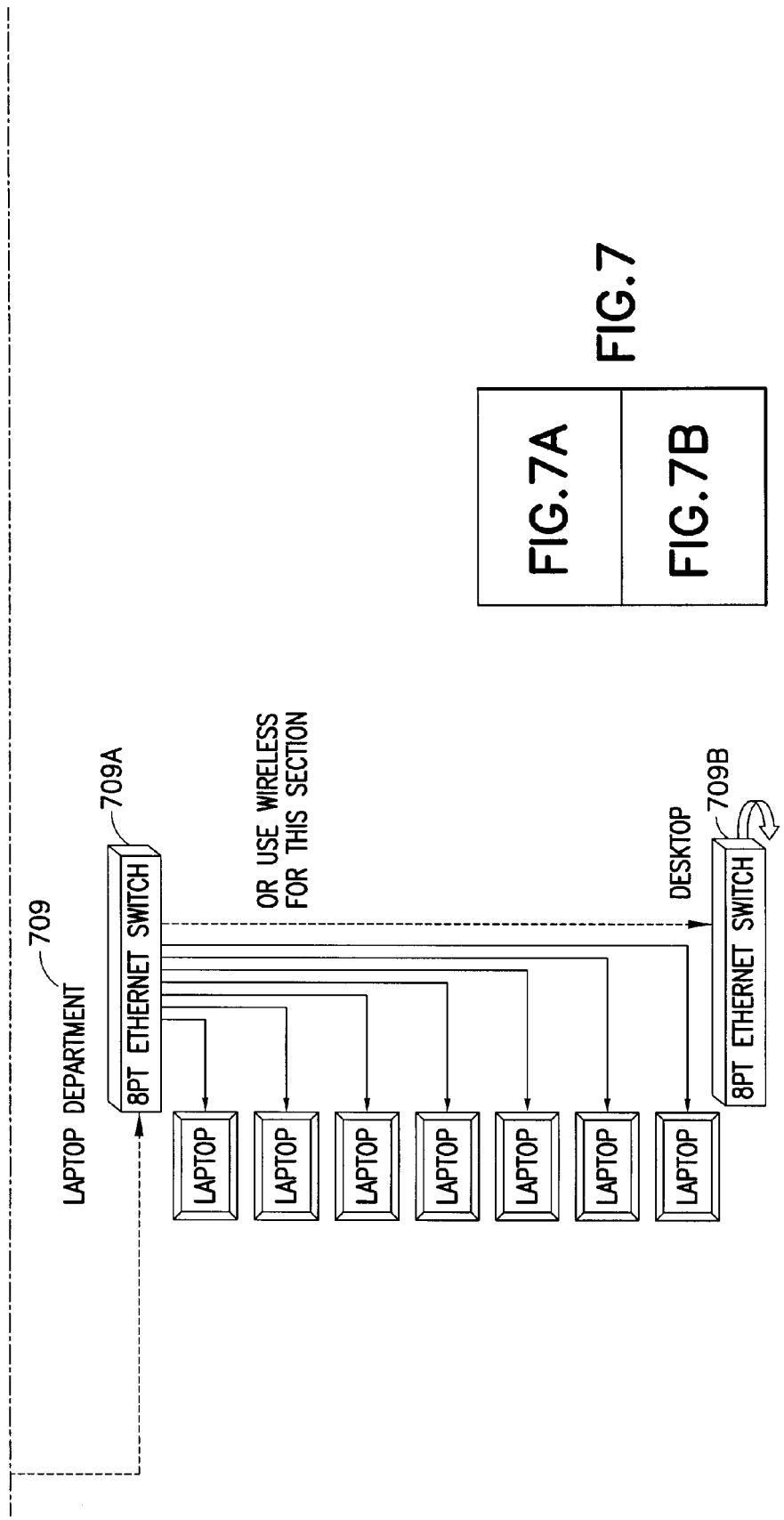

SYSTEM AND METHOD FOR EXHIBITING AT LEAST VISUAL CONTENT IN ONE OR MORE PHYSICAL RETAIL STORES

RELATED APPLICATIONS

This application is a continuation of U.S. patent application Ser. No. 12/540,150, filed Aug. 12, 2009, now U.S. Pat. No. 8,321,292 which claims the benefit of U.S. Provisional Application Ser. No. 61/088,290, filed Aug. 12, 2008 and U.S. Provisional Application Ser. No. 61/188,961, filed Aug. 14, 2008, and U.S. Provisional Application Ser. No. 61/109,095, filed Oct. 28, 2008, each of which is incorporated herein by reference in their entirety.

FIELD OF THE INVENTION

One embodiment of the present invention is directed to a system for exhibiting at least visual content in one or more physical retail stores.

Another embodiment of the present invention is directed to a method for exhibiting at least visual content in one or more physical retail stores.

Another embodiment of the present invention is directed to a programmed computer for exhibiting at least visual content in one or more physical retail stores.

Another embodiment of the present invention is directed to a computer readable medium for exhibiting at least visual content in one or more physical retail stores.

In one example, the visual content may comprise advertising and/or operating specifications and/or performance specifications and/or dimensions and/or price displayed on a television, a computer monitor, a laptop computer display, a notebook computer display and/or a netbook computer display.

In another example, the advertising and/or operating specifications and/or performance specifications and/or dimensions and/or price may relate specifically to the television upon which the advertising is being displayed.

In another example, the advertising and/or operating specifications and/or performance specifications and/or dimensions and/or price may relate specifically to the computer monitor upon which the advertising is being displayed.

In another example, the advertising and/or operating specifications and/or performance specifications and/or dimensions and/or price may relate specifically to the computer associated with a computer monitor upon which the advertising is being displayed.

In another example, the advertising and/or operating specifications and/or performance specifications and/or dimensions and/or price may relate specifically to the laptop computer (and/or notebook computer and/or netbook computer) upon which the advertising is being displayed (wherein the advertising displayed on the laptop/notebook/netbook display).

For the purposes of describing and claiming the present invention the term "physical potential item to be purchased" is intended to refer to an item that may be purchased off of a display or an essentially fungible item that may be purchased from inventory.

BACKGROUND OF THE INVENTION

Physical retail stores typically have many items on display. In the case of electronics stores, for example, many televisions (TVs), computers and the like are often on display for viewing by potential purchasers.

Various embodiments of the present invention provide a mechanism to show, on the display items, certain specifications, advertising, prices and/or the like when input is received from a potential purchaser.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Further, the figures are not necessarily to scale, some features may be exaggerated to show details of particular components (and any data, size, material and similar details shown in the figures are, of course, intended to be illustrative and not restrictive). Therefore, specific structural and functional details disclosed herein are not to be interpreted as limiting, but merely as a representative basis for teaching one skilled in the art to variously employ the present invention.

Figure 1:
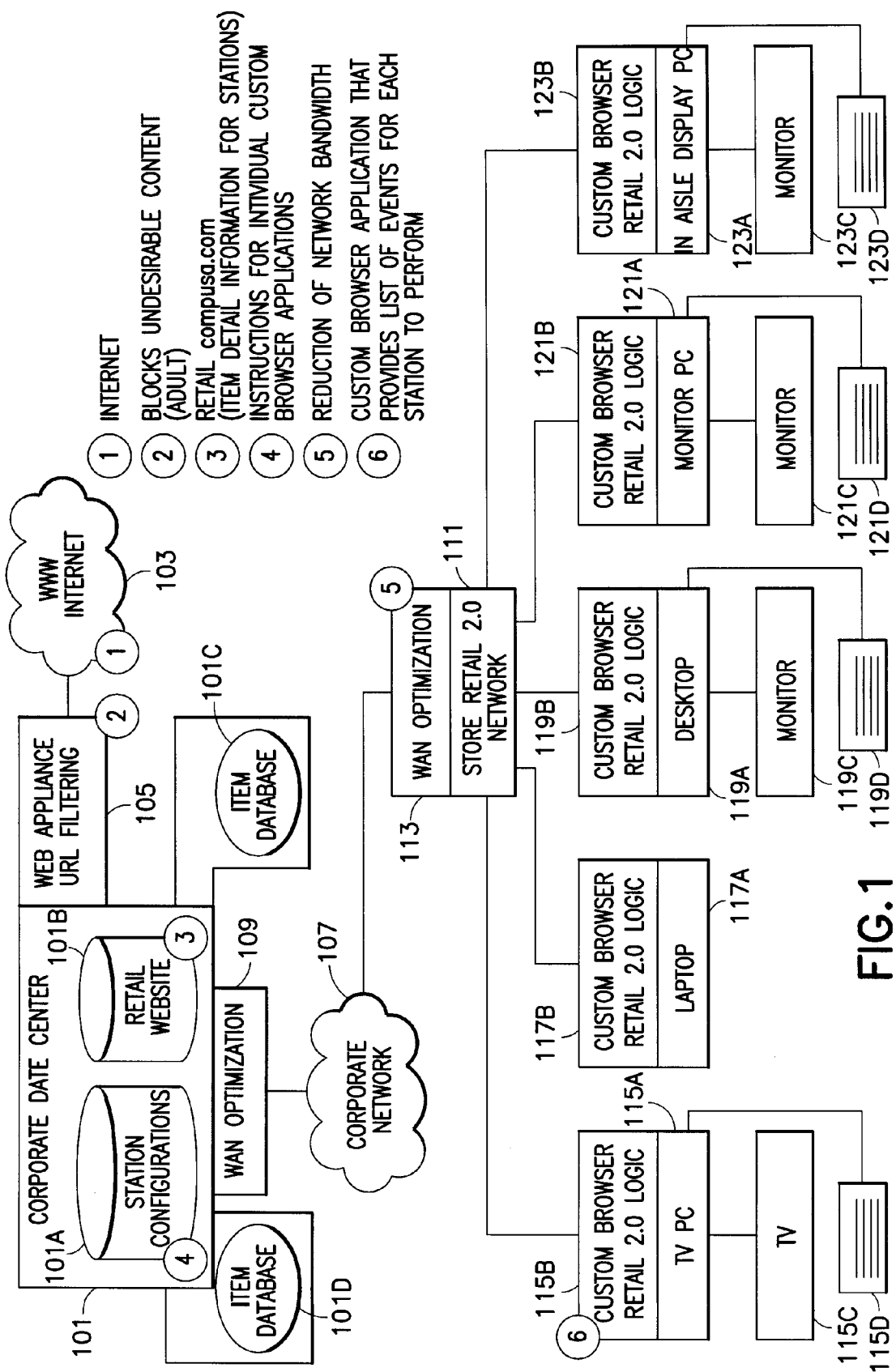
FIG. 1 shows a block diagram (a high-level architecture diagram) according to one embodiment of the present invention.

Reference will now be made to FIG. 1, showing one embodiment of the present invention. As seen in this FIG. 1, corporate data center 101 (including station configurations 101A and retail website 101B) may communicate (e.g., bi-directionally) with Internet 103. The communication between corporate data center 101 and Internet 103 may be via web appliance 105 (which may comprise, for example, hardware and/or software). Web appliance 105 may provide URL filtering (e.g., web appliance 105 may block undesirable content (e.g., adult content)).

Further, corporate data center 101 may communicate (e.g., bi-directionally) with corporate network 107. As seen, the communication between corporate data center 101 and corporate network 107 may be via web optimization 109 (which may comprise, for example, hardware and/or software). Web optimization 109 may provide for reduction of use of network bandwidth.

Further, physical retail store network 111 may communicate (e.g., bi-directionally) with corporate network 107. As seen, the communication between physical retail store network 111 and corporate network 107 may be via web optimization 113 (which may comprise, for example, hardware and/or software). Web optimization 113 may provide for reduction of use of network bandwidth.

Of note, using the configuration described above, store network 111 may, of course, communicate (e.g., bi-directionally) with corporate data center 101 via corporate network 107.

Of further note, while one store network is shown and described with reference to this FIG. 1, it is to be understood, of course, that various embodiments of the present invention may be applied, for example, to multiple store networks communicating (e.g., bi-directionally) with a corporate data center.

Still referring to FIG. 1, it is seen that computer 115A (e.g., a personal computer) may have installed thereon a web browser 115B (in one example, the browser may be a custom web browser application with desired logic for carrying out various functions described herein; in another example, the browser may be a standard web browser with custom logic for carrying out various functions described herein). Computer 115A (and web browser 115B) may communicate (e.g., bi-directionally) with store network 111 (in one example, the communication is carried out via one or more wired and/or one or more wireless communication channels). Further, TV 115C is associated with computer 115A and may communicate (e.g., bi-directionally) with computer 115A (in one example, the communication is carried out via one or more wired and/or one or more wireless communication channels). Further, keyboard 115D is associated with computer 115A and may communicate (e.g., bi-directionally) with computer 115A (in one example, the communication is carried out via one or more wired and/or one or more wireless communication channels). Further, any other desired input device(s) for controlling computer 115A may be provided (e.g., a mouse, a trackball, a touch-sensitive surface, a momentary push-button switch). Further, in one example, the computer 115A (and web browser 115B) may be supplied for the purpose of providing to the TV 115C various functionality described herein (e.g., the TV 115C may be a stand-alone TV that does not require the computer 115A (and web browser 115B) for normal operation).

Still referring to FIG. 1, it is seen that laptop computer 117A may have installed thereon a web browser 117B (in one example, the browser may be a custom web browser application with desired logic for carrying out various functions described herein; in another example, the browser may be a standard web browser with custom logic for carrying out various functions described herein). Laptop computer 117A (and web browser 117B) may communicate (e.g., bi-directionally) with store network 111 (in one example, the communication is carried out via one or more wired and/or one or more wireless communication channels). Further, while laptop computer may have an integrated keyboard, trackball and/or touch-sensitive surface, any other desired input device (s) for controlling laptop computer 117A may be provided (e.g., a mouse, a momentary push-button switch). Further, in one example, the web browser 117B may be supplied for the purpose of providing to the laptop computer 117A various functionality described herein (e.g., the laptop computer 117A may be a stand-alone laptop computer that does not require the web browser 115B for normal operation).

Still referring to FIG. 1, it is seen that computer 119A (e.g., a desktop computer) may have installed thereon a web browser 119B (in one example, the browser may be a custom web browser application with desired logic for carrying out various functions described herein; in another example, the browser may be a standard web browser with custom logic for carrying out various functions described herein). Computer 119A (and web browser 119B) may communicate (e.g., bi-directionally) with store network 111 (in one example, the communication is carried out via one or more wired and/or one or more wireless communication channels). Further, monitor 119C is associated with computer 119A and may communicate (e.g., bi-directionally) with computer 119A (in one example, the communication is carried out via one or more wired and/or one or more wireless communication channels). Further, keyboard 119D is associated with computer 119A and may communicate (e.g., bi-directionally) with computer 119A (in one example, the communication is carried out via one or more wired and/or one or more wireless communication channels). Further, any other desired input device(s) for controlling computer 119A may be provided (e.g., a mouse, a trackball, a touch-sensitive surface, a momentary push-button switch). Further, in one example, the web browser 119B may be supplied for the purpose of providing to the computer 119A various functionality described herein (e.g., the computer 119A may be a stand-alone computer that does not require the web browser 119B for normal operation). Further still, monitor 119C may be of the type normally associated with a desktop computer.

Still referring to FIG. 1, it is seen that computer 121A (e.g., a personal computer) may have installed thereon a web browser 121B (in one example, the browser may be a custom web browser application with desired logic for carrying out various functions described herein; in another example, the browser may be a standard web browser with custom logic for carrying out various functions described herein). Computer 121A (and web browser 121B) may communicate (e.g., bi-directionally) with store network 111 (in one example, the communication is carried out via one or more wired and/or one or more wireless communication channels). Further, monitor 121C is associated with computer 121A and may communicate (e.g., bi-directionally) with computer 121A (in one example, the communication is carried out via one or more wired and/or one or more wireless communication channels). Further, keyboard 121D is associated with computer 121A and may communicate (e.g., bi-directionally) with computer 121A (in one example, the communication is carried out via one or more wired and/or one or more wireless communication channels). Further, any other desired input device(s) for controlling computer 121A may be provided (e.g., a mouse, a trackball, a touch-sensitive surface, a momentary push-button switch). Further, in one example, the computer 121A (and web browser 121B) may be supplied for the purpose of providing to the monitor 121C various functionality described herein. Further still, monitor 121C may be of the type normally associated with a desktop computer.

Still referring to FIG. 1, it is seen that computer 123A (e.g., an in-aisle display personal computer) may have installed thereon a web browser 123B (in one example, the browser may be a custom web browser application with desired logic for carrying out various functions described herein; in another example, the browser may be a standard web browser with custom logic for carrying out various functions described herein). Computer 123A (and web browser 123B) may communicate (e.g., bi-directionally) with store network 111 (in one example, the communication is carried out via one or more wired and/or one or more wireless communication channels). Further, monitor 123C is associated with computer 123A and may communicate (e.g., bi-directionally) with computer 123A (in one example, the communication is carried out via one or more wired and/or one or more wireless communication channels). Further, keyboard 123D is associated with computer 123A and may communicate (e.g., bi-directionally) with computer 123A (in one example, the communication is carried out via one or more wired and/or one or more wireless communication channels). Further, any other desired input device(s) for controlling computer 123A may be provided (e.g., a mouse, a trackball, a touch-sensitive surface, a momentary push-button switch). Further, in one example, the web browser 123B may be supplied for the purpose of providing to the computer 123A various functionality described herein (e.g., the computer 123A may be a stand-alone computer that does not require the web browser 123B for normal operation). Further still, monitor 123C may be of the type normally associated with a personal computer.

In operation, web browser 115B may receive (e.g., for display on TV 115C) one or more instructions from station configurations 101A (such station configurations 101A may comprise, for example, one or more databases). In one example, certain specific instruction(s) in station configurations 101A may relate individually to web browser 115B (and/or computer 115A and/or TV 115C). Moreover, web browser 115B may (for example, based on the instruction(s) from station configurations 101A) provide a list of event(s) for each station (that is, web browser, computer, TV unit) to perform. In one example, the event(s) to perform may include displaying on TV 115C item detail information related to that specific TV (e.g., that specific TV make and model). In another example, item detail information related to that specific TV may be obtained (e.g., by web browser 115B) from retail website 101B (such retail website 101B may comprise, for example, one or more databases). In one specific example, the retail website 101B may be "retail.compusa.com". In another example, the website may be reached via the Internet.

Further, web browser 117B may receive (e.g., for display on the laptop display screen) one or more instructions from station configurations 101A (as mentioned above, such station configurations 101A may comprise, for example, one or more databases). In one example, certain specific instruction(s) in station configurations 101A may relate individually to web browser 117B (and/or laptop computer 117A). Moreover, web browser 117B may (for example, based on the instruction(s) from station configurations 101A) provide a list of event(s) for each station (that is, web browser, laptop computer unit) to perform. In one example, the event(s) to perform may include displaying on the laptop display screen item detail information related to that specific laptop computer (e.g., that specific laptop computer make and model). In another example, item detail information related to that specific laptop computer may be obtained (e.g., by web browser 117B) from retail website 101B (as mentioned above, such retail website 101B may comprise, for example, one or more databases). As mentioned above, in one specific example, the retail website 101B may be "retail.compusa.com". As mentioned above, in another example, the website may be reached via the Internet.

Further, web browser 119B may receive (e.g., for display on monitor 119C) one or more instructions from station configurations 101A (as mentioned above, such station configurations 101A may comprise, for example, one or more databases). In one example, certain specific instruction(s) in station configurations 101A may relate individually to web browser 119B (and/or computer 119A and/or monitor 119C). Moreover, web browser 119B may (for example, based on the instruction(s) from station configurations 101A) provide a list of event(s) for each station (that is, web browser, computer, monitor unit) to perform. In one example, the event(s) to perform may include displaying on monitor 119C item detail information related to that specific computer (e.g., that specific computer make and model). In another example, item detail information related to that specific computer may be obtained (e.g., by web browser 119B) from retail website 101B (as mentioned above, such retail website 101B may comprise, for example, one or more databases). In one specific example, the retail website 101B may be "retail.compusa.com". As mentioned above, in another example, the website may be reached via the Internet.

Further, web browser 121B may receive (e.g., for display on monitor 121C) one or more instructions from station configurations 101A (as mentioned above, such station configurations 101A may comprise, for example, one or more databases). In one example, certain specific instruction(s) in station configurations 101A may relate individually to web browser 121B (and/or computer 121A and/or monitor 121C). Moreover, web browser 121B may (for example, based on the instruction(s) from station configurations 101A) provide a list of event(s) for each station (that is, web browser, computer, monitor unit) to perform. In one example, the event(s) to perform may include displaying on monitor 121C item detail information related to that specific monitor (e.g., that specific monitor make and model). In another example, item detail information related to that specific monitor may be obtained (e.g., by web browser 121B) from retail website 101B (as mentioned above, such retail website 101B may comprise, for example, one or more databases). In one specific example, the retail website 101B may be "retail.compusa.com". As mentioned above, in another example, the website may be reached via the Internet.

Further, web browser 123B may receive (e.g., for display on monitor 123C) one or more instructions from station configurations 101A (as mentioned above, such station configurations 101A may comprise, for example, one or more databases). In one example, certain specific instruction(s) in station configurations 101A may relate individually to web browser 123B (and/or computer 123A and/or monitor 123C). Moreover, web browser 123B may (for example, based on the instruction(s) from station configurations 101A) provide a list of event(s) for each station (that is, web browser, computer, monitor unit) to perform. In one example, the event(s) to perform may include displaying on monitor 123C item detail information related to that specific computer (e.g., that specific computer make and model). In another example, item detail information related to that specific computer may be obtained (e.g., by web browser 123B) from retail website 101B (as mentioned above, such retail website 101B may comprise, for example, one or more databases). In one specific example, the retail website 101B may be "retail.compusa.com". As mentioned above, in another example, the website may be reached via the Internet.

Of note, while FIG. 1 shows an example mix of devices (e.g., personal computer, laptop, monitor, TV), it is to be understood, of course, that various embodiments of the present invention may utilize any desired number (e.g., from 0 to 500) of each type of device at any given physical retail store location.

In another example, instructions may be communicated to one or more of the web browsers 115B, 117B, 119B, 121B, 123B through the Internet 103 and/or through corporate network 107.

In another example, item detail information (and/or other content) may be communicated to one or more of the web browsers 115B, 117B, 119B, 121B, 123B through the Internet 103 and/or through corporate network 107.

In another embodiment of the present invention a single corporate data center may communicate (e.g., bi-directionally) in a one-to-one relationship with a single store (e.g., physical retail store) network. In another embodiment of the present invention a single corporate data center may communicate (e.g., bi-directionally) in a one-to-many relationship with a plurality of store (e.g., physical retail store) networks. In another embodiment of the present invention plurality of corporate data centers may communicate (e.g., bi-directionally) with a plurality of store (e.g., physical retail store) networks. In another embodiment of the present invention a plurality of corporate data centers may communicate (e.g., bi-directionally) in a many-to-one relationship with a single store (e.g., physical retail store) network.

In another embodiment of the present invention a system for exhibiting at least visual content in a physical retail store is provided, comprising: at least a first physical potential item to be purchased (see, e.g., TV 115C, laptop 117A, desktop computer 119A, monitor 121C or in-aisle display PC 123A of FIG. 1) and a second physical potential item to be purchased (see, e.g., TV 115C, laptop 117A, desktop computer 119A, monitor 121C and/or in-aisle display PC 123A of FIG. 1), wherein the first physical potential item to be purchased and the second physical potential item to be purchased are located on display in the physical retail store (of course the present invention may be applied to any desired number of physical retail store(s)); a central server (see, e.g., corporate data center 101 of FIG. 1, which may comprise one or more servers), at least a first client computer (see, e.g., TV PC 115A, laptop 117A, desktop computer 119A, monitor PC 121A or in-aisle display PC 123A of FIG. 1) and a second client computer (see, e.g., TV PC 115A, laptop 117A, desktop computer 119A, monitor PC 121A or in-aisle display PC 123A of FIG. 1), wherein the first client computer has installed thereon a first application (the first application may comprise, for example, custom browser 115B, 117B, 119B, 121B or 123B of FIG. 1 and/or a default browser) and the second client computer has installed thereon a second application (the second application may comprise, for example, custom browser 115B, 117B, 119B, 121B or 123B of FIG. 1 and/or a default browser); a correlation database (see, e.g., station configurations 101A of FIG. 1) associated with the central server (in one example, such association may comprise the correlation database being operatively accessible by the central server (although not necessarily in the same physical location)), wherein the correlation database stores data relating to: (a) correlation between the first client computer to the first physical potential item to be purchased; and (b) correlation between the second client computer to the second physical potential item to be purchased; an item database (see, e.g., item database 101C of FIG. 1) associated with the central server (in one example, such association may comprise the item database being operatively accessible by the central server (although not necessarily in the same physical location)), wherein the item database stores data relating to: (a) information of the first physical potential item to be purchased including a specified physical retail store (e.g., including, but not limited to a specified location, a specified physical retail store and/or a specified location in a specified (e.g., larger) physical retail store) and specifications (e.g., operating specifications, performance specifications, dimensions and/or price) regarding the first physical potential item to be purchased; and (b) information of the second physical potential item to be purchased including a specified physical retail store (e.g., including, but not limited to a specified location, a specified physical retail store and/or a specified location in a specified (e.g., larger) physical retail store) and specifications (e.g., operating specifications, performance specifications, dimensions and/or price) regarding the second physical potential item to be purchased; wherein the central server periodically communicates with the first client computer and the second client computer, wherein the first client computer is located in the physical retail store; wherein the second client computer is located in the physical retail store; wherein the first client computer is associated to the first physical potential item to be purchased; wherein the second client computer is associated to the second physical potential item to be purchased; wherein the first client computer has at least one input device that is connected to the first client computer, wherein the input device connected to the first client computer is located in the physical retail store, and wherein the input device connected to the first client computer is configured to allow for direct interaction with a potential purchaser of the first physical potential item to be purchased; wherein the second client computer has at least one input device that is connected to the second client computer, wherein the input device connected to the second client computer is located in the physical retail store, and wherein the input device connected to the second client computer is configured to allow for direct interaction with a potential purchaser of the second physical potential item to be purchased; wherein the first application installed on the first client computer comprises:

i) a default browser for communicating with the Internet, an intranet or a combination thereof;
    ii) a software program that directly interacts with the input device connected to the first client computer; and
    iii) a custom browser comprising:
        1. a first software element that is capable of obtaining at least visual content from a source other than the central server; and
        2. a second software element that receives instructions from the central server on a periodic basis; and wherein the second application installed on the second client computer comprises:

i) a default browser for communicating with the Internet, an intranet or a combination thereof;
    ii) a software program that directly interacts with the input device connected to the second client computer; and
    iii) a custom browser comprising:
        1. a first software element that is capable of obtaining at least visual content from a source other than the central server; and
        2. a second software element that receives instructions from the central server on a periodic basis.

In one example, each of the first physical potential item to be purchased and the second physical potential item to be purchased may be selected from the group including (but not limited to): a television, a desktop computer, a laptop computer, a notebook computer, a netbook computer.

In another example, the first application installed on the first client computer may comprise a software application and the second application installed on the second client computer may comprise a software application.

In another example, the central server may periodically communicate with the first client computer and the second client computer at a period selected from the group including (but not limited to): every second, every 10 seconds, every 20 seconds, every 30 seconds, every minute, every hour, every day, every week, every month.

In another example, the central server may periodically communicate with the first client computer and the second client computer in real-time.

In another example, central server may communicate with the first client computer at essentially the same periodicity that the central server communicates with the second client computer.

In another example, central server may communicate with the first client computer at a different periodicity than the central server communicates with the second client computer.

In another example, the central server may periodically communicate at uniform intervals.

In another example, the central server may periodically communicate at non-uniform intervals.

In another example, at least one of: (a) the first client computer may be the first physical potential item to be purchased; and (b) the second client computer may be the second physical potential item to be purchased.

In another example, each of: (a) the first client computer may be the first physical potential item to be purchased; and (b) the second client computer may be the second physical potential item to be purchased.

In another example, the first software element associated with the first client computer that is capable of obtaining at least visual content from a source other than the central server may be capable of obtaining at least visual and/or audio and/or media (e.g., multi-media) content from a source other than the central server and the first software element associated with the second client computer that is capable of obtaining at least visual content from a source other than the central server may be capable of obtaining at least visual and/or audio and/or media (e.g., multi-media) content from a source other than the central server.

In another example, the system may further comprise an inventory database (see, e.g., inventory database 101D of FIG. 1) associated with the central server (in one example, such association may comprise the inventory database being operatively accessible by the central server (although not necessarily in the same physical location)), wherein the inventory database may store data relating to: (a) an inventory amount of the first physical potential item to be purchased; and (b) an inventory amount of the second physical potential item to be purchased.

In another example, the second software element associated with the first client computer may receive instructions from the central server comprising at least one instruction indicating the source from which the first software element associated with the first client computer is to obtain content (in one example, the source may be an Internet-accessible website and/or database); and the second software element associated with the second client computer may receive instructions from the central server comprising at least one instruction indicating the source from which the first software element associated with the second client computer is to obtain content (in one example, the source may be an Internet-accessible website and/or database).

In another embodiment of the present invention a method performed in a computing system for exhibiting at least visual content in a physical retail store is provided, comprising: displaying in the physical retail store at least a first physical potential item to be purchased and a second physical potential item to be purchased; locating at least a first client computer and a second client computer in the physical retail store, wherein the first client computer has installed thereon a first application and the second client computer has installed thereon a second application; associating the first client computer to the first physical potential item to be purchased; associating the second client computer to the second physical potential item to be purchased; storing, in a correlation data structure associated with a central server, data relating to: (a) correlation between the first client computer to the first physical potential item to be purchased; and (b) correlation between the second client computer to the second physical potential item to be purchased; storing, in an item data structure associated with the central server, data relating to: (a) information of the first physical potential item to be purchased including a specified physical retail store and specifications regarding the first physical potential item to be purchased; and (b) information of the second physical potential item to be purchased including a specified physical retail store and specifications regarding the second physical potential item to be purchased; wherein the central server periodically communicates with the first client computer and the second client computer, wherein the first client computer has at least one input device that is connected to the first client computer, wherein the input device connected to the first client computer is located in the physical retail store, and wherein the input device connected to the first client computer is configured to allow for direct interaction with a potential purchaser of the first physical potential item to be purchased; wherein the second client computer has at least one input device that is connected to the second client computer, wherein the input device connected to the second client computer is located in the physical retail store, and wherein the input device connected to the second client computer is configured to allow for direct interaction with a potential purchaser of the second physical potential item to be purchased; wherein the first application installed on the first client computer comprises:
  i) a default browser for communicating with the Internet, an intranet or a combination thereof;
  ii) a software program that directly interacts with the input device connected to the first client computer; and
  iii) a custom browser comprising:
    1. a first software element that is capable of obtaining at least visual content from a source other than the central server; and
    2. a second software element that receives instructions from the central server on a periodic basis; and
  wherein the second application installed on the second client computer comprises:
  i) a default browser for communicating with the Internet, an intranet or a combination thereof;
  ii) a software program that directly interacts with the input device connected to the second client computer; and
  iii) a custom browser comprising:
    1. a first software element that is capable of obtaining at least visual content from a source other than the central server; and 2. a second software element that receives instructions from the central server on a periodic basis.

In one example, the computing system may include one or more programmed computers.

In another example, the computing system may be distributed over a plurality of programmed computers.

In another example, the correlation data structure may comprise one or more databases and the item data structure may comprise one or more databases.

In another example, the steps may be carried out in the order recited.

In another embodiment of the present invention a programmed computer for exhibiting at least visual content in a physical retail store displaying at least a first physical potential item to be purchased and a second physical potential item to be purchased is provided, comprising:
  a central server comprising:
    a memory having at least one region for storing computer executable program code; and
    a processor for executing the program code stored in the memory;
  a first client computer that has installed thereon a first application, the first client computer comprising:
    a memory having at least one region for storing the first application; and
    a processor for executing the first application stored in the memory;
  a second client computer that has installed thereon a second application, the second client computer comprising:
    a memory having at least one region for storing the second application; and
    a processor for executing the second application stored in the memory;
  a correlation data structure associated with the central server, wherein the correlation database stores data relating to: (a) correlation between the first client computer to the first physical potential item to be purchased; and (b) correlation between the second client computer to the second physical potential item to be purchased;
    an item data structure associated with the central server, wherein the item database stores data relating to: (a) information of the first physical potential item to be purchased including a specified physical retail store and specifications regarding the first physical potential item to be purchased; and (b) information of the second physical potential item to be purchased including a specified physical retail store and specifications regarding the second physical potential item to be purchased;
  wherein the program code stored in the memory of the central server is executed by the processor of the central server to periodically communicate with the first client computer and the second client computer,
  wherein the first client computer is located in the physical retail store;
  wherein the second client computer is located in the physical retail store;
  wherein the first client computer is associated to the first physical potential item to be purchased;
  wherein the second client computer is associated to the second physical potential item to be purchased;
  wherein the first client computer has at least one input device that is connected to the first client computer, wherein the input device connected to the first client computer is located in the physical retail store, and wherein the input device connected to the first client computer is configured to allow for direct interaction with a potential purchaser of the first physical potential item to be purchased;
  wherein the second client computer has at least one input device that is connected to the second client computer, wherein the input device connected to the second client computer is located in the physical retail store, and wherein the input device connected to the second client computer is configured to allow for direct interaction with a potential purchaser of the second physical potential item to be purchased;
  wherein the first application installed on the first client computer comprises:
    i) a default browser for communicating with the Internet, an intranet or a combination thereof;
    ii) a software program that directly interacts with the input device connected to the first client computer; and
    iii) a custom browser comprising:
      1. a first software element that is capable of obtaining at least visual content from a source other than the central server; and
      2. a second software element that receives instructions from the central server on a periodic basis; and
  wherein the second application installed on the second client computer comprises:
    i) a default browser for communicating with the Internet, an intranet or a combination thereof;
    ii) a software program that directly interacts with the input device connected to the second client computer; and
    iii) a custom browser comprising:
      1. a first software element that is capable of obtaining at least visual content from a source other than the central server; and
      2. a second software element that receives instructions from the central server on a periodic basis.

In one example, the programmed computer may include one or more processors.

In another example, the programmed computer may be distributed over several physical locations.

In another example, the correlation data structure may comprise one or more databases and the item data structure may comprise one or more databases.

In another embodiment of the present invention a computer readable medium encoded with computer readable program code for exhibiting at least visual content in a physical retail store displaying at least a first physical potential item to be purchased and a second physical potential item to be purchased, wherein a first client computer is associated to the first physical potential item to be purchased, wherein the first client computer has installed thereon a first application, wherein the second client computer is associated to the second physical potential item to be purchased, and wherein the second client computer has installed thereon a second application is provided, the program code including subroutines for: storing, in a correlation data structure associated with a central server, data relating to: (a) correlation between the first client computer to the first physical potential item to be purchased; and (b) correlation between the second client computer to the second physical potential item to be purchased; storing, in an item data structure associated with the central server, data relating to: (a) information of the first physical potential item to be purchased including a specified physical retail store and specifications regarding the first physical potential item to be purchased; and (b) information of the second physical potential item to be purchased including a specified physical retail store and specifications regarding the second physical potential item to be purchased; wherein the central server periodically communicates with the first client computer and the second client computer, wherein the first client computer has at least one input device that is connected to the first client computer, wherein the input device connected to the first client computer is located in the physical retail store, and wherein the input device connected to the first client computer is configured to allow for direct interaction with a potential purchaser of the first physical potential item to be purchased; wherein the second client computer has at least one input device that is connected to the second client computer, wherein the input device connected to the second client computer is located in the physical retail store, and wherein the input device connected to the second client computer is configured to allow for direct interaction with a potential purchaser of the second physical potential item to be purchased; wherein the first application installed on the first client computer comprises:
  i) a default browser for communicating with the Internet, an intranet or a combination thereof;
  ii) a software program that directly interacts with the input device connected to the first client computer; and
  iii) a custom browser comprising:
    1. a first software element that is capable of obtaining at least visual content from a source other than the central server; and
    2. a second software element that receives instructions from the central server on a periodic basis; and
wherein the second application installed on the second client computer comprises:
  i) a default browser for communicating with the Internet, an intranet or a combination thereof;
  ii) a software program that directly interacts with the input device connected to the second client computer; and
  iii) a custom browser comprising:
    1. a first software element that is capable of obtaining at least visual content from a source other than the central server; and
    2. a second software element that receives instructions from the central server on a periodic basis.

In one example, the program code may be distributed across one or more programmed computers.

In another example, the program code may be distributed across one or more processors.

In another example, the program code may be distributed over several physical locations.

In another example, the correlation data structure may comprise one or more databases and the item data structure may comprise one or more databases.

Figure 2:
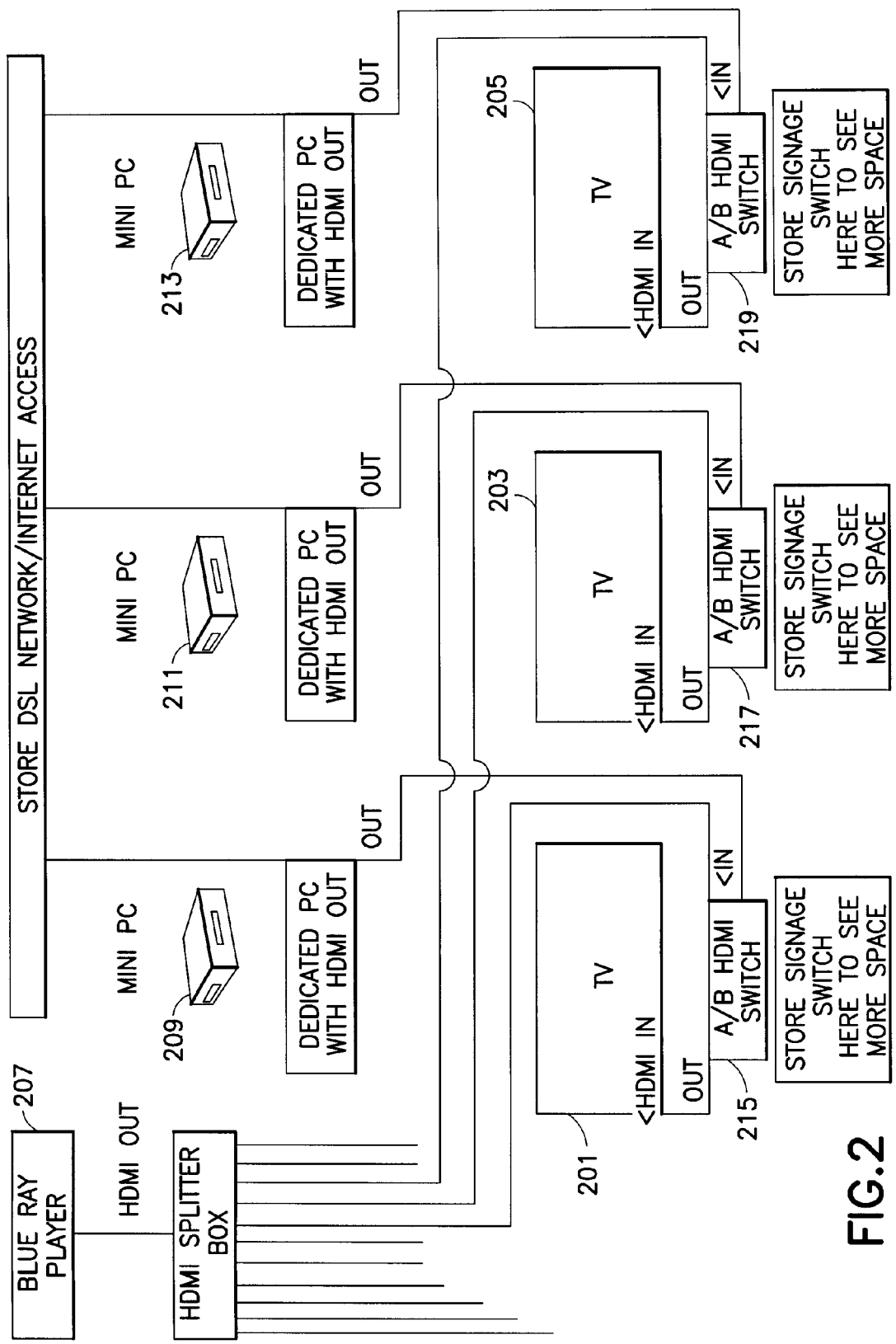
FIG. 2 shows a block diagram (a detailed interconnect diagram) according to another embodiment of the present invention.

Reference will now be made to FIG. 2, showing another embodiment of the present invention. As seen in this FIG. 2, a system for exhibiting at least visual content in a physical retail store is provided, comprising: a plurality of televisions 201, 203, 205 located on display in the physical retail store; at least one video source 207; a plurality of client computers 209, 211, 213 at the physical retail store, each of the plurality of client computers being operatively connected to the Internet (and/or an intranet); a plurality of signal switching mechanisms 215, 217, 219, wherein each of the plurality of signal switching mechanisms comprises a first signal input port, a second signal input port and an output port, and wherein each of the plurality of signal switching mechanisms is associated with one of the plurality of televisions such that an output port of each of the plurality of signal switching mechanisms provides an input to a respective one of the plurality of televisions; wherein each of the plurality of signal switching mechanisms has a first state via which a signal from the video source at the first signal input port is provided to the output port and a second state via which a signal from one of the plurality of client computers at the second signal input port is provided to the output port; wherein each of the plurality of signal switching mechanisms is controllable to be in one of the first and second states by a user actuating each of the plurality of signal switching mechanisms from a location proximate the plurality of televisions; and wherein each of the plurality of client computers provides to a respective television, via a respective one of the plurality of signal switching mechanisms in the second state, visual content comprising a webpage including at least advertising and/or operating specifications and/or performance specifications and/or dimensions and/or price details of the respective television.

In one example, visual and/or audio and/or media (e.g., multi-media) content may be provided.

In another example, the video source may be selected from the group including (but not limited to): a movie, cable television, satellite television, network television, DVD, Blue-Ray.

In another example, the signal switching mechanisms may be momentary switches. In another example, a default for each signal switching mechanism may be the video source (e.g., first state).

In another example, each signal switching mechanism may be operated remotely by a user.

In another example, each displayed webpage (and/or website) may include price.

In another example, each TV may be selected from the group including (but not limited to): Plasma, LCD, projection (front or rear).

In another embodiment of the present invention a system for exhibiting at least visual content in a physical retail store is provided, comprising: at least one video source; a plurality of computers located on display in the physical retail store, each of the plurality of computers being operatively connected to the Internet and each of the plurality of computers comprising a signal input port for receiving a signal from the video source; software operative on each of the plurality of computers to switch between a first state via which the signal from the video source at the signal input port is provided to a display screen associated with each of the plurality of computers and a second state via which a webpage from the Internet is provided to the display screen associated with each of the plurality of computers; wherein the software operative on each of the plurality of computers is controllable to be in one of the first and second states by a user actuating the software; and each of the plurality of computers provides to a respective display screen, wherein the respective computer is in the second state, visual content comprising a webpage including at least advertising and/or operating specifications and/or performance specifications and/or dimensions and/or price details of the respective computer.

In one example, visual and/or audio and/or media (e.g., multi-media) content may be provided.

In another example, the video source may be selected from the group including (but not limited to): a movie, cable television, satellite television, network television, DVD, Blue-Ray.

In another example, the signal switching mechanisms may be momentary switches. In another example, a default for each signal switching mechanism may be the video source (e.g., first state).

In another example, each signal switching mechanism may be operated remotely by a user.

In another example, each displayed webpage (and/or website) may include price.

In another example, each TV may be selected from the group including (but not limited to): Plasma, LCD, projection (front or rear).

In another example, each computer may be selected from the group including (but not limited to): desktop, PC, laptop, notebook, netbook.

Figure 3:
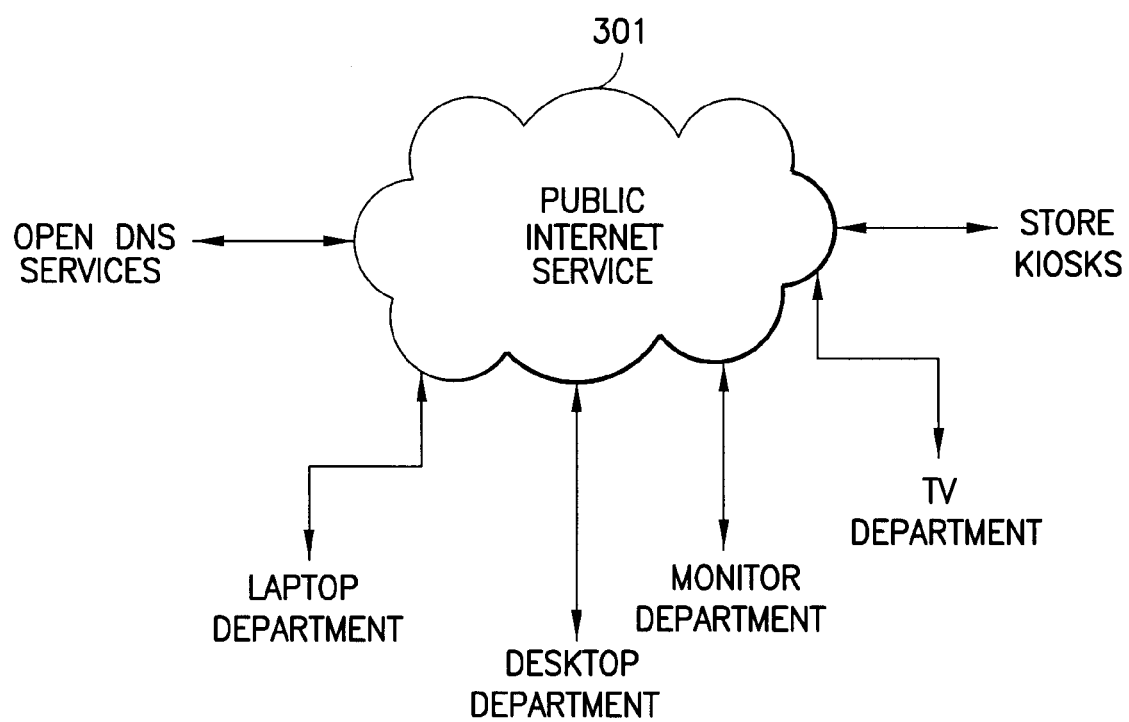
FIG. 3 shows a block diagram (a high-level architecture diagram) according to another embodiment of the present invention.

Reference will now be made to FIG. 3, showing a block diagram (a high-level architecture diagram) according to another embodiment of the present invention.

As seen in this FIG. 3 (showing a "Retail 2.0 Interactive Information (RIIS) Distribution System Interconnectivity Detail" example), a plurality of Ethernet drops are provided (each Ethernet drop is represented in this FIG. 3 by each line between Internet 301 and each area in which these products are displayed: Store Kiosks, TV department, Monitor Department, Desktop Department, and laptop Department). In one example, items located on a gondola will require a single Ethernet drop to the gondola. In another example, each gondola and associated display area may utilize switch(es) to accommodate the number of units in each display area. In another example, laptops, notebooks and/or netbooks (and/or any other types of items) may use wireless connectivity (e.g., to reduce physical hardware expenses and number of Ethernet ready locations necessary).

In another example, each router may utilize OpenDNS services (free) which may allow control of access to only "family friendly" sites and block most (if not all) pornography, warze and other such undesirable sites through integrated DNS based filtering without, for example, use of additional software or hardware. One specific example of setup procedures is as follows: modify the DNS records within the router in each store to any required values. Furthermore, OpenDNS may allow for monitoring of traffic on these networks.

In another example, each product display station may be assigned a "Station ID" (e.g., numerical value). This Station ID may be marked onto the physical surface of the gondola (shelf and/or shelf tag area) to allow quick and easy reference for setup of display units. In one example, each RIT (Retail Interactive Terminal) within the Monitor and TV departments are permanent units.

In another example, the start URL for each station may include this Station ID (this may be an important configuration element).

In another example, all product display units as well as Store Kiosks may utilize the same starting URL with a trailing Station ID. In another example, this configuration may allow for centralized control.

In another example, a master station map may be created for each store. In another example, all Station IDs may be centrally configured (e.g., within Retail Interactive Control System (RICS)).

Reference will now be made to a TV Department (HDTV Service) example. Each TV department may require multiple HDMI splitters to accommodate the number of display units. In TV departments with non-contiguous shelving, Ethernet based HDMI extension devices may be used to distribute the HD signal. In another example, remote units may be connected to alternative HD source (e.g., DVD) such as, for example, to reduce cost.

Each HDMI splitter (e.g., max capacity 1×10 or 1×8) may be required to use one port to "daisy chain" to the next sequential area of the display. In one example, a minimum of 6 splitters may be used in each store).

Reference will now be made to a TV RIIS example. Each HDMI output may connect to a 2×1 HDMI switch at each television location. Each HDMI switch may provide for "momentary switching" from the primary (or default) position to a secondary position for a desired period of time (e.g., 30 seconds, 45 seconds, 60 seconds, 90 seconds, 180 seconds, 5 minutes, 10 minutes) then reset to the primary (or default) position. In one example, the secondary input into each HDMI switch may come from the station associated RIT with HDMI out. In a TV RIT potential alternative example: No audio from PC and use DVI to HDMI adapters for connection and reduce overall cost greatly and allow for consistent builds utilizing DVI to VGA and DVI to HDMI adapters).

In one example, the following hardware may be utilized (per store): HDMI splitters (6+/store), HDMI cables (126/store), HDMI 2×1 switches (42/store), RIT units (42/store).

Reference will now be made to a Monitor/LCD Display Department (Display RIIS) example. Each Monitor Department may have a RIT for each assigned station ID.

With reference now to a monitor department RIIS example, installation of inactivity content may be carried out. In one example, video may be integrated into a screen-saver application (e.g., utilizing local content and not pull from web).

With reference now to a laptop (notebook/netbook) department RIIS example, installation of inactivity content may be carried out and RDCS and/or Kiosk software may be implemented. In one example, video may be integrated into a screen-saver application (e.g., utilizing local content and not pull from web).

With reference now to a desktop department RIIS example, installation of inactivity content may be carried out and RDCS and/or Kiosk software may be implemented. In one example, video may be integrated into a screen-saver application (e.g., utilizing local content and not pull from web).

In another example, each RIT may have DVI output with DVI to VGA adapters on hand to provide for flexible connectivity with display units. In one example, each RIT may be permanent to each station and not be moved or require reconfiguration after initial setup.

In another example, all display units may provide video (and/or audio) content during inactivity messaging to provide maximum display appeal and provide good demonstration of unit abilities.

With reference now to a laptop (notebook/netbook) department example, each laptop may require configuration upon placement of display unit. In this example, each laptop may be associated with the appropriate Station ID. In this example, each laptop may be connected only to the public network. In this example, each laptop may have the CD-Drive and USB Ports disabled. In this example, each laptop may be required to have installed thereon the Retail Device Control System (RDCS) to lockdown O/S interaction (Kiosk software and protect against spyware and the like).

With reference now to a desktop department example, each desktop may require configuration upon placement of display unit. In this example, each desktop may be associated with the appropriate Station ID. In this example, each desktop may be connected only to the public network. In this example, each desktop may have the CD-Drive and USB Ports disabled. In this example, each monitor attached to each desktop may be listed as an associated SKU in RICS. In this example, speakers attached to each desktop may be listed as an associated SKU in RICS. In this example, each desktop may be required to have installed thereon the Retail Device Control System (RDCS) to lockdown O/S interaction (Kiosk software and protect against spyware and the like).

Figure 4:
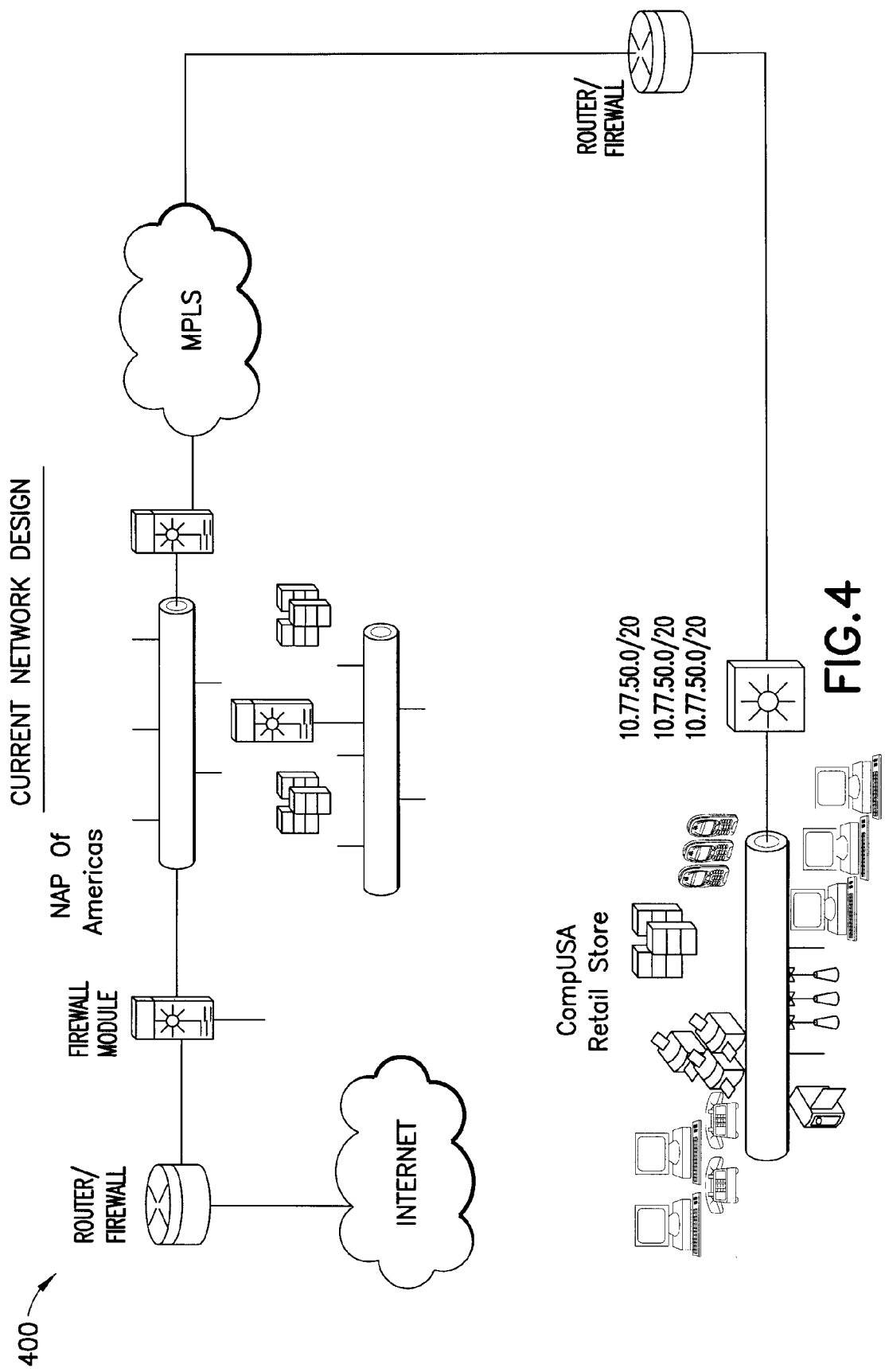
FIG. 4 shows a block diagram (a high-level architecture diagram) according to another embodiment of the present invention (the diagram of this FIG. 4 relates to a baseline network design example).
Figure 5:
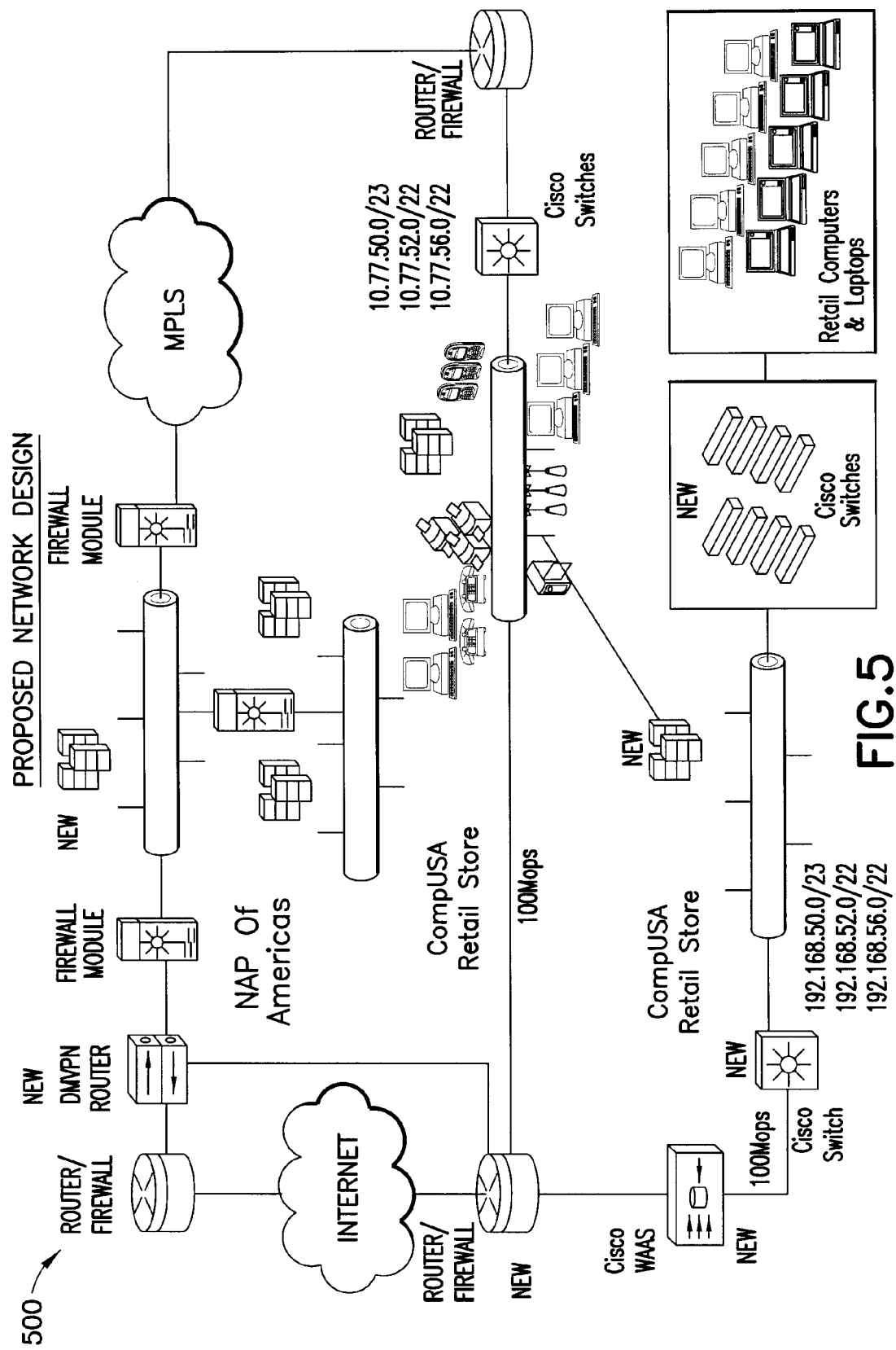
FIG. 5 shows a block diagram (a high-level architecture diagram) according to another embodiment of the present invention (the diagram of this FIG. 5 relates to a modification of the baseline network design example of FIG. 4, wherein this FIG. 5 includes an additional network).

Referring now to FIGS. 4 and 5 (showing, respectively network architectures 400 and 500), it is seen that FIG. 4 shows a block diagram (a high-level architecture diagram) according to another embodiment of the present invention (the diagram of this FIG. 4 relates to a baseline network design example) and it is seen that FIG. 5 shows a block diagram (a high-level architecture diagram) according to another embodiment of the present invention (the diagram of this FIG. 5 relates to a modification of the baseline network design example of FIG. 4, wherein this FIG. 5 includes an additional network).

Still referring to FIGS. 4 and 5, various embodiments of the present invention may provide for the creation of a separate network (e.g., separate from an existing corporate network) for item(s) displayed and for sale in physical retail store(s). In another example, such a separate network may provide additional redundancy to an existing network for store operations. In another example, such a separate network may be provided adequate bandwidth (in addition to that provided an existing network). In another example, an existing network may be provided protection from such a separate network. In another example, management functionality of such a separate network may be provided.

Referring again, for example, to FIGS. 4 and 5, various embodiments of the present invention may provide redundancy. Such redundancy may be used, for example, to remove the router as a single point of failure for store operations and/or to remove the Verizon MPLS cloud as a single point of failure for store operations. In one example, a new router may be implemented with a connection to the Internet for redundancy for router and Verizon MPLS cloud. In another example, a backup site-site VPN connection may be provided from a new router to a new DMVPN router @ NAP.

Referring again, for example, to FIGS. 4 and 5, various embodiments of the present invention may provide additional bandwidth. Such additional bandwidth may be used, for example, to supplement existing bandwidth used solely for store operations. In one example, a pipe to the Internet with the capacity necessary to allow for store operations (backup) and the item(s) displayed and for sale (e.g., computers/laptops/TVs) network may be provided. In another example, a Cisco WAAS solution may be provided to allow for caching of web sites and/or streaming videos (e.g., to enhance buyer experience).

Referring again, for example, to FIGS. 4 and 5, various embodiments of the present invention may provide security. Such security may be used, for example, to minimize the risk of store operations being impacted by the separate network used for the buyer experience. In one example, a firewall feature set may be enabled on the router(s). In another example, only specific traffic may be allowed to this Domain Controller. In another example, the following may be provided for: communicate with Active Directory @ NAP; communicate with Configuresoft for compliance; communicate with CSA and anti-virus for protection. In another example, an IPS feature set may be enabled on the router(s). In another example, systems may be secured via group policy. In another example, surfing (web surfing) may be controlled based on policies applied in IronPort @ the NAP.

Referring again, for example, to FIGS. 4 and 5, various embodiments of the present invention may provide management (e.g., ease of management for the separate network). In one example, a TigerRetail.net Active directory may be provided for the separate network. In another example, an Active Directory may be managed via server(s) in the NAP and each physical retail store may also have one Domain Controller. In another example, central management of group policies (e.g., to push content) may be provided. In another example, management of switches/routers may be provided.

Figure 6:
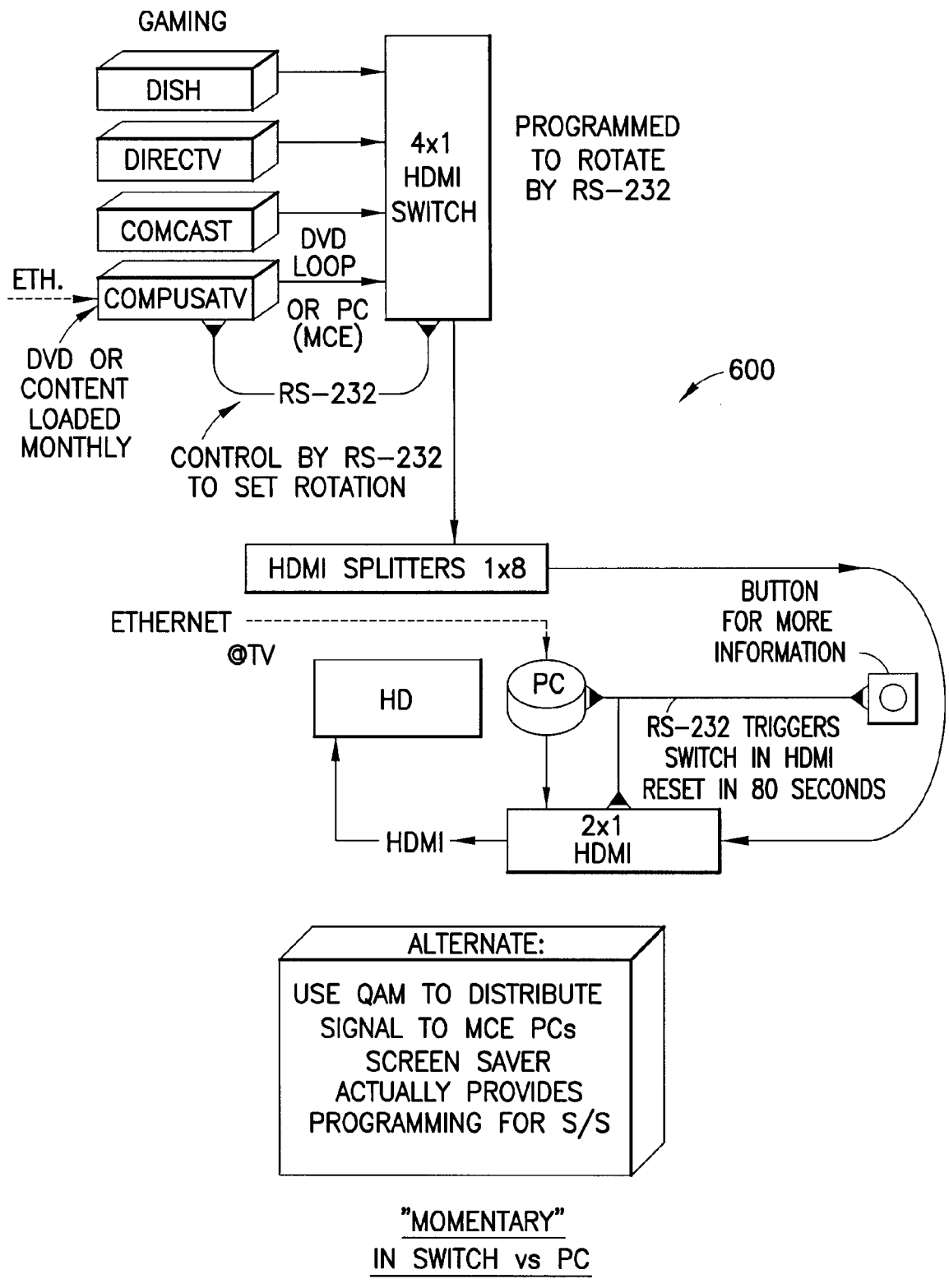
FIG. 6 shows a block diagram (a detailed interconnect diagram) according to another embodiment of the present invention.

Referring now to FIG. 6, this Fig. shows a block diagram (a detailed interconnect architecture 600) according to another embodiment of the present invention.

Referring now to FIG. 7, this Fig. shows a block diagram (a detailed interconnect architecture 700) according to another embodiment of the present invention. As seen, this example interconnect architecture includes Internet 701; physical retail store desktop department 703 (including switch 703A, user actuated momentary switch 703B and a plurality of computers and monitors); physical retail store monitor/display department 705 (including switch 705A, user actuated momentary switch 705B and a plurality of PC stations and monitors); physical retail store television department 707 (including switch 707A, user actuated momentary switch 707B and a plurality of televisions and PC stations); and physical retail store laptop department 709 (including switch 709A, user actuated momentary switch 709B and a plurality of laptops (including integrated display screens).

Figure 8:
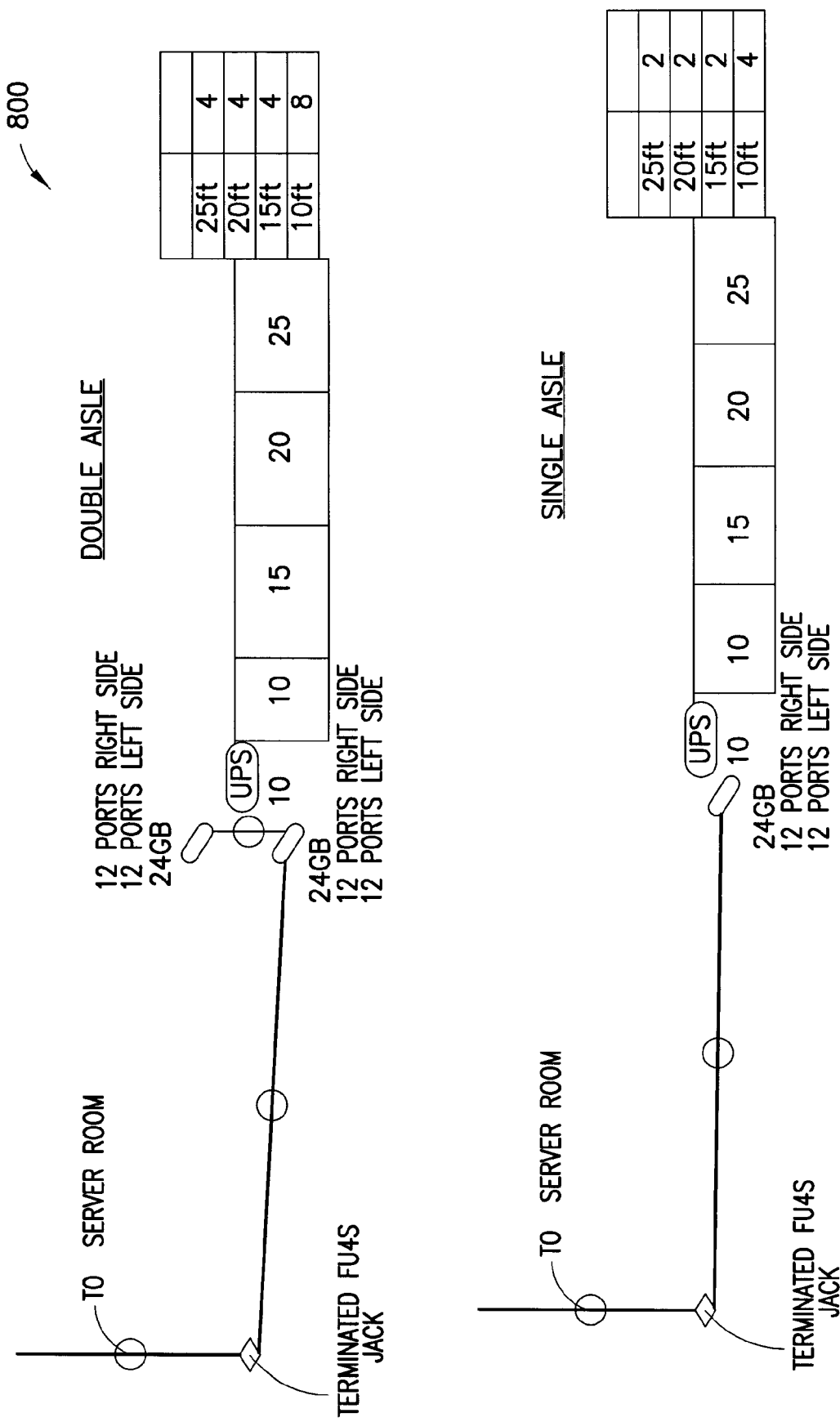
FIG. 8 shows a block diagram (a high-level architecture diagram) according to another embodiment of the present invention.

Referring now to FIG. 8, this Fig. shows a block diagram (a high-level architecture 800) according to another embodiment of the present invention. As seen, this example relates to network connectivity in the context of physical retail store aisle network footprint for single sided and double sided aisles. In one example, GB bandwidth is used in connection with CAT 5E cable to each drop (depending, for example, on distances involved). Of course, this FIG. 8 provides an example, and any desired number and location of drops (e.g., Ethernet drops) may be used per store).

Figure 9:
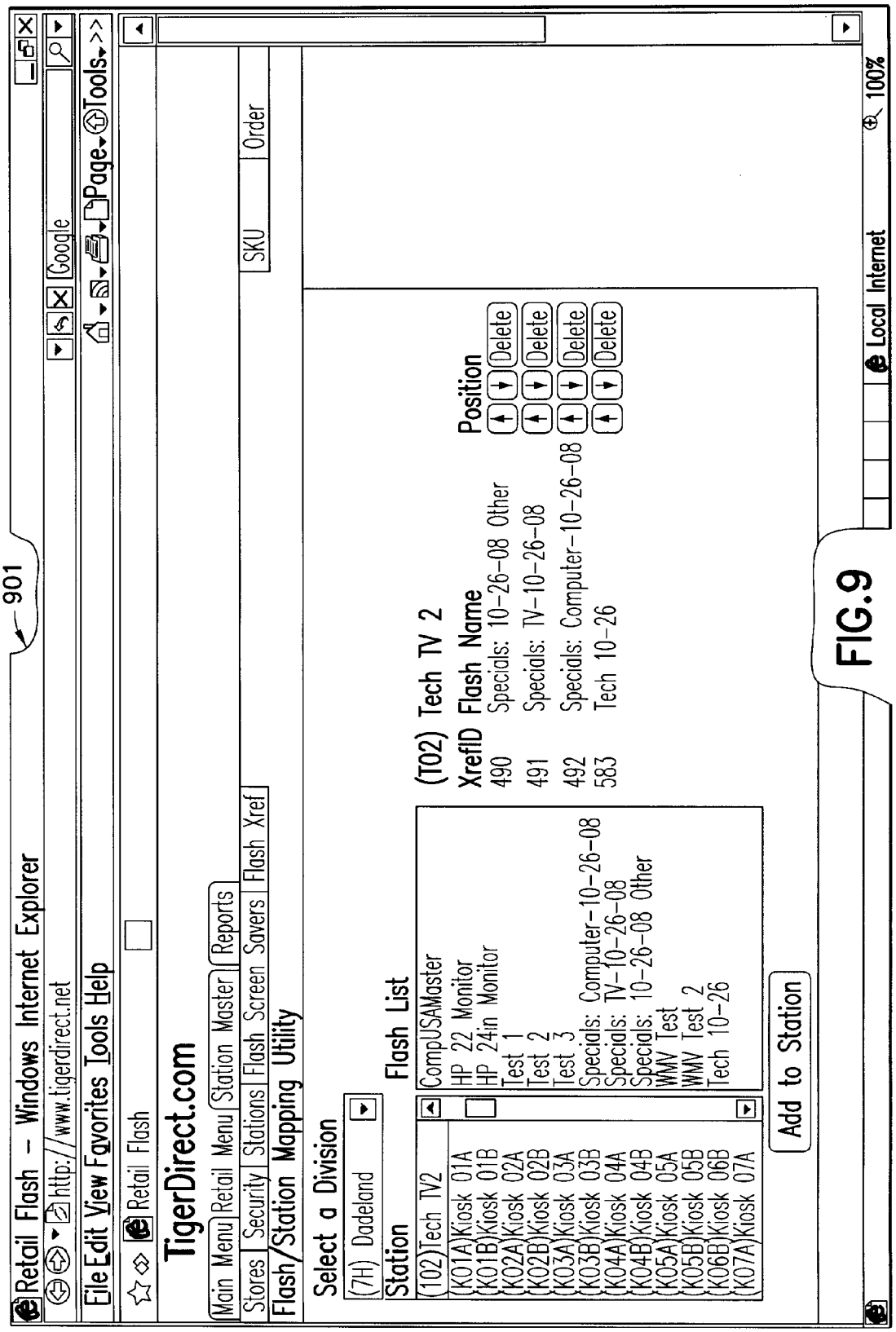
FIG. 9 shows a web browser configuration page example according to another embodiment of the present invention.

Referring now to FIG. 9, this Fig. shows an example web browser configuration page 901. In one example, the configuration may be used to configure (e.g., from a central location) the identification, naming and/or functions of one or more remotely situated computers (e.g., remotely situated in one or more physical retail stores).

Figure 10:
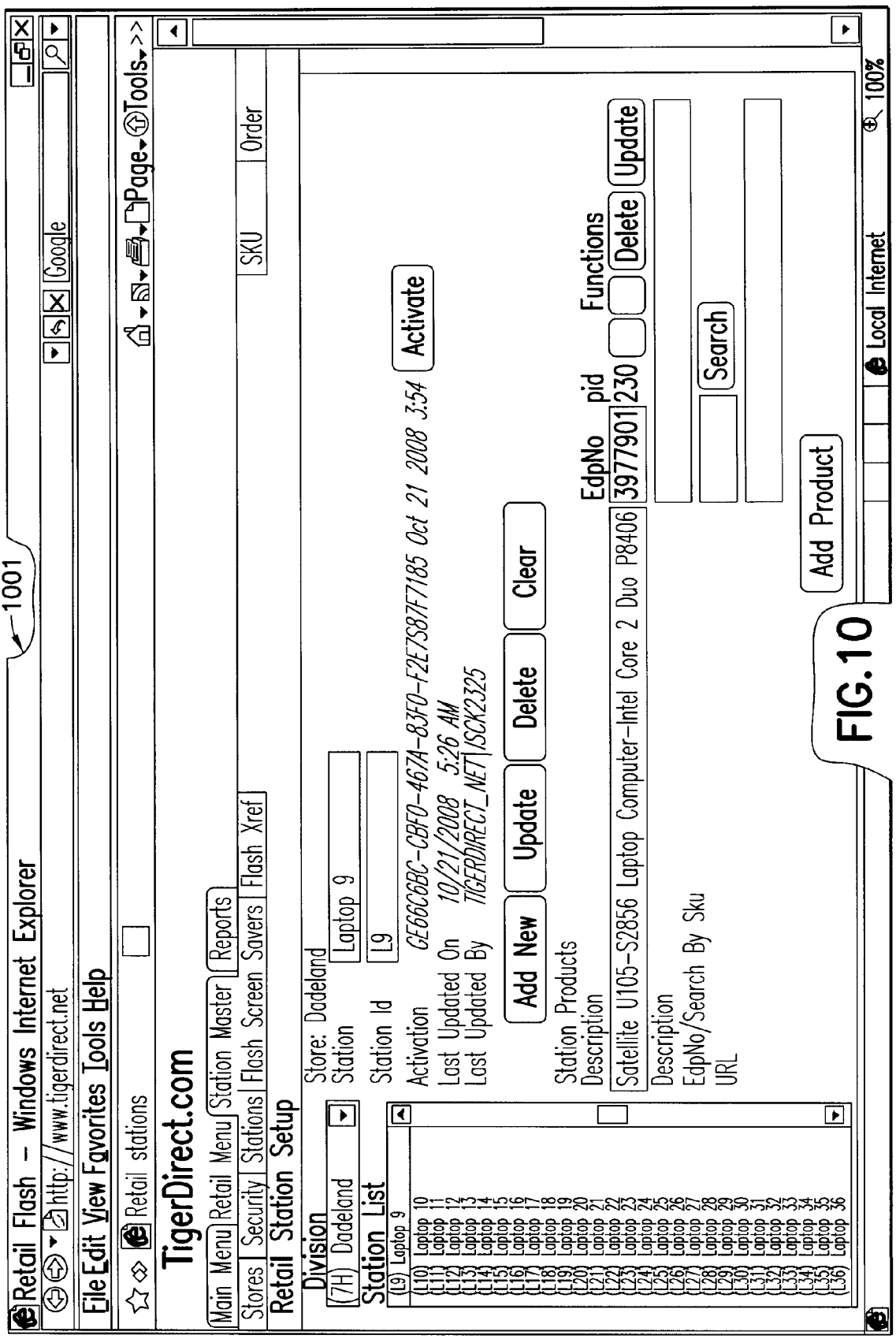
FIG. 10 shows a web browser configuration page example according to another embodiment of the present invention.

Referring now to FIG. 10, this Fig. shows an example web browser configuration page 1001. In one example, the configuration may be used to configure (e.g., from a central location) the identification, naming and/or functions of one or more remotely situated computers (e.g., remotely situated in one or more physical retail stores).

Figure 11:
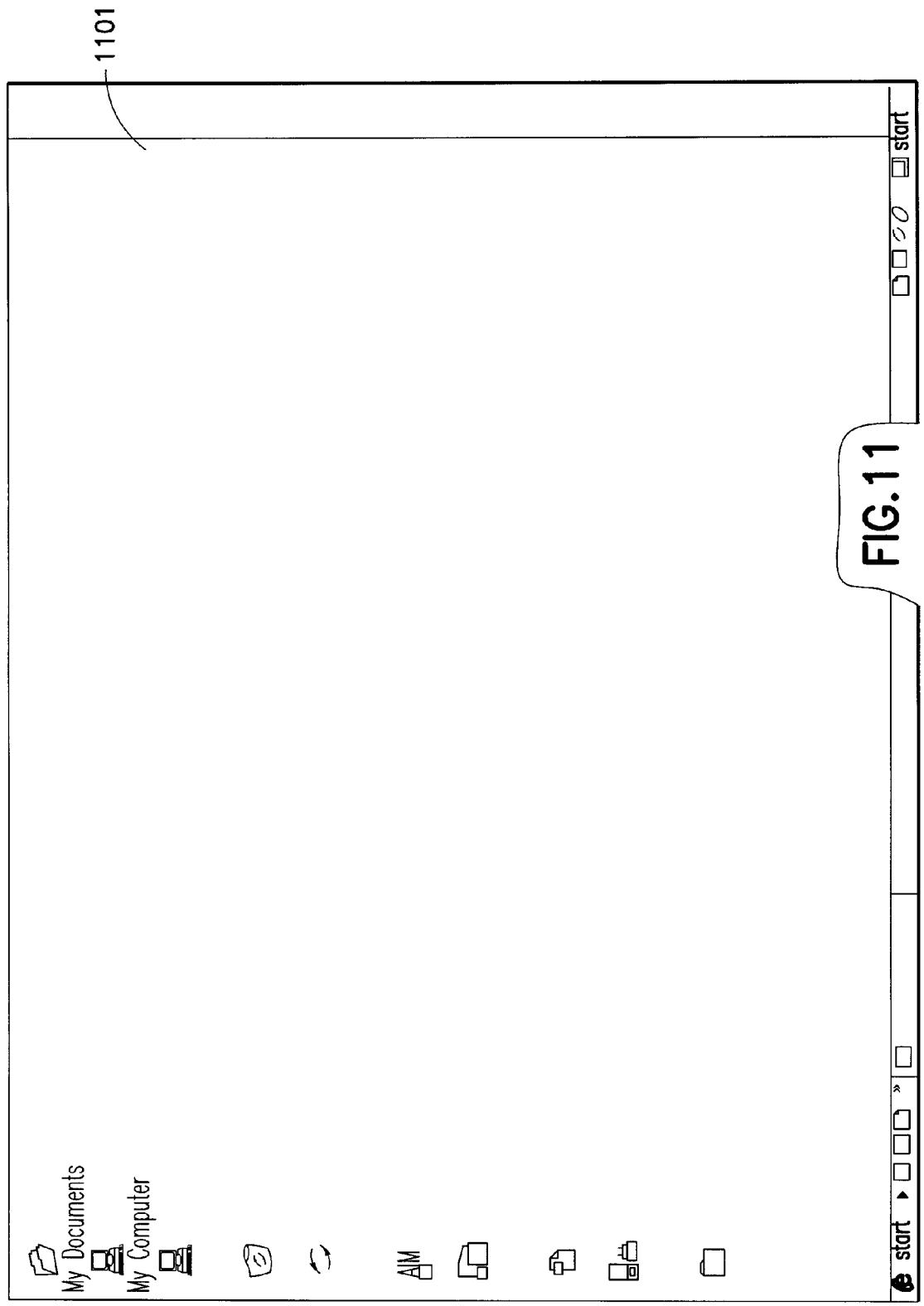
FIG. 11 shows a computer desktop example according to another embodiment of the present invention (wherein an Internet experience is not provided a potential purchaser).

Referring now to FIG. 11, this Fig. shows an example computer desktop 1101. In this example, an Internet experience is not provided to a potential purchaser.

Figure 12:
FIG. 12 shows a computer desktop example according to another embodiment of the present invention (wherein an Internet experience is provided a potential purchaser).

Referring now to FIG. 12, this Fig. shows an example computer desktop 1201. In this example, an Internet experience is provided to a potential purchaser.

In another embodiment of the present invention, any or all laptops/notebooks/netbooks and/or PC's that are on display in a physical retail store may become their own virtual Internet kiosk. For example, all computers may have a screen saver paging through corporate messages. When a person (e.g., customer and/or sales associate) walks up and takes a particular computer out of screen saver, the particular computer may wake up and display an Internet item details page (e.g., about the particular computer) on the screen. As a result, in one example, a person will be able to read the item details, watch videos, see a photo gallery, navigate the web, compare, and/or even navigate out to a desired website (e.g., Google).

In another embodiment of the present invention, certain functionality may be implemented on one or more TV's that are on display in a physical retail store. In one example, all TV's may have a similar hookup. In another example, a blue ray player may feed a HDMI Splitter which connects to a momentary A/B switch (e.g., one switch for each TV). The home (or default) position for the switch may be "Blue Ray". There may also a PC (e.g., a custom made Mini PC) connected to each A/B Switch. Each PC may have essentially the same software as mentioned above (e.g., home page is the item details information for a particular device (e.g., the item details information for the particular TV associated with the particular PC)). A custom HDMI switch box may be set up as a momentary switch so when the customer and/or sales associate pushes switch (e.g., a red switch), voila—the item details page comes up on the particular TV. Again, such item details page may display an Internet item details page (e.g., of the retailer) on the screen. As a result, in one example, a person may be able to read the item details, watch videos, see a photo gallery, navigate the web, compare, even navigate out to a desired website (e.g., Google). In one example, the momentary HDMI switch may stay active for a set period of time (e.g., 10 minutes) then resets back to default input (e.g., Blue Ray input). In yet another embodiment, the set-up may include a custom shelf for a mouse and/or keyboard sticking out with the button (e.g. big red button) mounted on it.

In a further embodiment, the present invention "brings the Internet to physical retail stores." For example, a live reality show may be webcast at one or more physical retail stores with real customers testing, using and reviewing the products. In another embodiment, the present invention may be set-up at kiosks and/or "unmanned" displays such as at airports, convention centers and/or malls.

In another embodiment visual (and/or audio and/or media (e.g., multi-media)) content (e.g., advertising, price, operating specifications, performance specifications, dimensions) may be provided for a specific potential item to be purchased (e.g., a camera, a video camera). In one example, a plurality of such items may be on display in a physical retail store. When triggered, the content may be displayed on a screen (e.g., one screen out of a plurality of screens—e.g., in a one-to-one relationship between screen and item on display) associated with one of the selected items. In one example, the trigger may be when a potential purchaser lifts the item (e.g., using a so-called "waterfall"). In another example, the trigger may be a proximity sensor. In another example, the trigger may be any desired input device (e.g., switch, button, etc.).

In another embodiment a kiosk or the like may be provided in a physical retail store. A potential purchaser may enter information into the kiosk identifying a physical potential item to be purchased. In one example, the information may be input by selection of the item by the potential purchaser from a list provided by the kiosk (the list may comprise search results, browsing results or the like). In another example, the information may be input by the potential purchaser by the scanning of a coupon, item box, UPC/SKU or the like. In another example, the information may be input by the potential purchaser by keyboard, mouse, trackball, touch screen, touch-sensitive device or the like. The kiosk may then indicate to the potential purchaser the physical location of the item in the store (e.g., by providing on a display and/or printing a map showing the item location at a particular shelf/aisle). In addition, a plurality of lamps, lights or the like may be disposed throughout the store to mark various aisles, shelves and/or particular positions at various aisles/shelves. In one example, the kiosk may (e.g., through a wired and/or wireless connection) cause appropriate lamp(s), light(s) or the like to illuminate to guide the potential purchaser to the item that the potential purchaser is interested in purchasing.

In another example, there may be a single server computer acting as a "central server". In another example, there may be a plurality of server computers, which may act together as a "central server".

In another example, rather than a plurality of client computers operatively associated with a respective plurality of physical potential items to be purchased (e.g., in a one-to-one relationship) to provide the functions described herein, a single client computer may be operatively associated with a plurality of physical potential items to be purchased (e.g., in a one-to-many relationship) to provide the functions described herein.

In another example, each default browser may be selected from the group including (but not limited to): INTERNET EXPLORER, FIREFOX, MOZILLA, CHROME, SAFARI, OPERA.

In another example, each input device may be selected from the group including (but not limited to): keyboard, mouse, touch screen, touch sensitive device, switch (e.g., momentary switch, switch that is activated upon lifting an item—so-called "waterfall", RFID, proximity sensor (e.g. heat, ultrasonic), weight-sensitive pad or mat).

In another example, any desired communication (e.g., between computer and input device, between computers, between a computer and an output device) may be via wired and/or wireless connection).

In another example, various embodiments of the present invention may comprise a hybrid of a distributed system and central system.

In another example, content (e.g., advertising, price, operating specifications, performance specifications, dimensions) may be provided on a first potential item to be purchased and the content (e.g., advertising, price, operating specifications, performance specifications, dimensions) may include data related to (e.g., comparing/contrasting) a second item (e.g., a second item on display in physical proximity to the first item).

In another example, central server instructions (e.g., to one or more custom browsers) may comprise instructions to obtain inventory data from an inventory database. In one example, the inventory data may direct a potential purchaser to another store in the same chain (e.g., provide a location and/or a map and/or a website for the re-directed store). In anther example, the inventory data may provide to the potential purchaser the amount of inventory at the other store. In anther example, the inventory data may provide to the potential purchaser one or more suggestions regarding one or more accessories, one or more complementary items and/or the like (in one example, the suggestions may be for items in the store at which the potential purchaser is present and/or for items in other store(s)).

In another example, a potential purchaser may push a button or the like to receive help (e.g., physical help at the customer's location from a sales person in a physical retail store). In another example, a response may comprise an IM (instant message), a call station, a chat with a technical expert.

In another example, content may comprise a virtual salesperson.

In another example, two modes may be provided: (1) Idle (example, signage for the unique item (e.g., based on store inventory); (2) Active (example, triggered by sensor (e.g., proximity sensor) and/or input device to serve "you" and change signage of each machine.

In another example, a custom browser may communicate with the central server and be updated (e.g., by the central server) to a current version, if required.

In another example, a custom browser may next communicate with the central server and notify the central server of the browser's location (e.g., unique position in a particular store in a chain).

In another example, a custom browser may next communicate with the central server and notify the central server of activity (e.g., unique to product/location/type).

In another example, a custom browser may next communicate with the central server and request/receive html.

In another example, a custom browser may next communicate with the central server and receive a URL.

In another example, a custom browser may next obtain content from the URL.

In another example, a custom browser may communicate with the central server and receive a series of instructions.

In another example, a custom browser may deliver content to a potential purchaser, disallow for remainder of computer (e.g., secure the computer, disallow viruses), and/or provide "idle messaging".

In another example, a custom browser may deliver content to a potential purchaser by obtaining the content from the Internet.

In another example, a custom browser may operate with a default browser (e.g., a custom browser may load a default browser inside or a default browser may be modified (e.g., via plug-ins or the like) into a custom browser). A user may then surf the web.

In another example, a custom browser may provide rudimentary functions (e.g., back/forward button, reset after no activity (e.g., 2 minutes), home button, cancel button, configuration button (e.g., store employees set up station), close button (e.g., close browser, password protected by central server). In one example, such rudimentary functions may be provide in connection with a TV.

In another example, a Kiosk application may include a custom browser. Such a Kiosk application may "lock down" the computer (e.g., prevent getting to the desktop) and/or periodically communicate (e.g., to get instructions) with a central server (e.g., every 20 minutes)—also could communicate upon start-up and upon configuration.

In another example, instructions may comprise: what product am I, starting page, when inactive what do I do (e.g., play shockwave file, play this movie), shut down and wake up at certain times (e.g., for energy savings), restrictions on browser use by customer.

As described herein, various embodiments of the present invention may provide interactivity with one or more potential purchasers.

In various other embodiments systems and methods for merging distribution of product information at physical retail store with Internet content distribution may be provided.

In another embodiment, although the above discussion of the present application relating to the "physical potential item to be purchased" is generally in terms of electronic devices, the present application is not so limited. Suitable physical potential item(s) to be purchased may include, but are not limited to: shoes, bedding, consumer products, kitchen products, bath products and/or any other appropriate items.

In other examples, an "input device" may include (but not be limited to) a wireless device (e.g., cell phone, "smartphone", PDA) that is capable of communicating with a computer (e.g., with a client computer and/or with a central server). In various examples, such communication may be via WI-FI, telephone network, and/or any other appropriate communication channel(s).

In another embodiment, the instructions can include targeted content for the specific physical potential item to be purchased. For example, the retailer can "co-market" with a specific manufacturer so that "competitive brands" of the specific physical potential item to be purchased have instructions downloaded to include content that displays the specific physical potential item to be purchased. In a specific example, since the central server knows the specific location of the specific physical potential item to be purchased in the physical retail store and the other physical potential items to be purchased that are next to or near (i.e. adjacent or in otherwise close proximity) the specific physical potential item to be purchased, these "next to or near" "physical potential items to be purchased, although "competitive brands," may display content of the specific physical potential item to be purchased.

In yet another example, the specific physical potential item to be purchased can have instructions comprising "rules" and/or algorithms downloaded from the central server. For example, a "rule" can include that, since the central server can be associated with an inventory database, below a certain inventory level, the specific physical potential item to be purchased can display content regarding other "equivalent" physical potential items to be purchased. In another example, the rule can include content regarding accessories and/or complementary physical potential items to be purchased and/or additional information on how to purchase (e.g. location in the retail store, place on the Internet).

In another embodiment, the content displayed by the specific physical potential item to be purchased can include market, sales and/or advertising regarding methods of obtaining the item and/or corresponding items from the Internet and/or other physical retail stores.

For the purposes of this disclosure, a computer readable medium is a medium that stores computer data/instructions in machine readable form. By way of example, and not limitation, a computer readable medium can comprise computer storage media as well as communication media, methods or signals. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to tangibly store the desired information and which can be accessed by the computer.

Further, the present invention may, of course, be implemented using any appropriate computer readable medium, computer hardware and/or computer software. In this regard, those of ordinary skill in the art are well versed in the type of computer hardware that may be used (e.g., one or more mainframes, one or more mini-computers, one or more personal computers ("PC"), one or more networks (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

Of course, any embodiment/example described herein (or any feature or features of any embodiment/example described herein) may be combined with any other embodiment/example described herein (or any feature or features of any such other embodiment/example described herein).

While a number of embodiments/examples of the present invention have been described, it is understood that these embodiments/examples are illustrative only, and not restrictive, and that many modifications may become apparent to those of ordinary skill in the art. For example, certain methods may be "computer implementable" or "computer implemented." Also, to the extent that such methods are implemented using a computer, not every step must necessarily be implemented using a computer. Further, any steps described herein may be carried out in any desired order (and any steps may be added and/or deleted).

What is claimed is:

1. A system for exhibiting at least visual content in a physical retail store, comprising:

a central server, at least a first client computer and a second client computer, wherein the first client computer has installed thereon a first application and the second client computer has installed thereon a second application;

an item database associated with the central server, wherein the item database stores data relating to: (a) information of a first physical potential item to be purchased including a first specified physical retail store and specifications regarding the first physical potential item to be purchased; and (b) information of a second physical potential item to be purchased including a second specified physical retail store and specifications regarding the second physical potential item to be purchased;

wherein the first client computer is located in the physical retail store;

wherein the second client computer is located in the physical retail store;

wherein the first client computer interacts with the first physical potential item, displayed in the physical retail store, to be purchased;

wherein the first physical potential item to be purchased comprises hardware and software that are necessary for the first client computer to interact with the first physical potential item to be purchased;

wherein the second client computer interacts with the second physical potential item, displayed in the physical retail store, to be purchased;

wherein the second physical potential item to be purchased comprises hardware and software that are necessary for the second client computer to interact with the second physical potential item to be purchased;

wherein the first client computer has at least one input device that is connected to the first client computer, wherein the input device connected to the first client computer is located in the physical retail store, and wherein the input device connected to the first client computer is configured to allow for direct interaction with a first potential purchaser of the first physical potential item and to receive at least one first input from the first potential purchaser;

wherein the second client computer has at least one input device that is connected to the second client computer, wherein the input device connected to the second client computer is located in the physical retail store, and wherein the input device connected to the second client computer is configured to allow for direct interaction with a second potential purchaser of the second physical potential item and to receive at least one second input from the second potential purchaser;

wherein the first application installed on the first client computer comprises:

i) a first software program that directly interacts with the input device connected to the first client computer; and ii) a second software program comprising:
1. a first software element that obtains at least first visual content from at least one first source other than the central server; and
2. a second software element that receives instructions from the central server on a periodic basis regarding the information of the first physical potential item to be purchased including the specifications regarding the first physical potential item;

wherein the first physical potential item to be purchased exhibits a first visual presentation based at least in part on: a) a location of the first physical potential item to be purchased, b) the specifications regarding the first physical potential item received from the first client computer, and c) the at least one first input received from the first client computer;

wherein the second application installed on the second client computer comprises:

i) a third software program that directly interacts with the input device connected to the second client computer; and ii) a fourth software program comprising:
1. a third software element that obtains at least second visual content from at least one second source other than the central server; and
2. a fourth second software element that receives instructions from the central server on a periodic basis regarding the information of the second physical potential item to be purchased including the specifications regarding the second physical potential item; and wherein the second physical potential item to be purchased exhibits a second visual presentation based at least in part on: a) a location of the second physical potential item to be purchased, b) the specifications regarding the second physical potential item, and c) the at least one second input received from the second client computer.

2. The system of claim 1, wherein each of the first physical potential item to be purchased and the second physical potential item to be purchased is selected from the group consisting of: a television, a desktop computer, a laptop computer, a notebook computer, a netbook computer.

3. The system of claim 1, wherein the central server periodically communicates with the first client computer and the second client computer at a period selected from the group comprising: every second, every 10 seconds, every 20 seconds, every 30 seconds, every minute, every hour, every day, every week, every month.

4. The system of claim 1, wherein the central server periodically communicates with the first client computer and the second client computer in real-time.

5. The system of claim 1, wherein the central server communicates with the first client computer at essentially the same periodicity that the central server communicates with the second client computer.

6. The system of claim 1, wherein at least one of: (a) the first client computer is the first physical potential item to be purchased; and (b) the second client computer is the second physical potential item to be purchased.

7. The system of claim 1, further comprising an inventory database associated with the central server, wherein the inventory database stores data relating to: (a) an inventory amount of the first physical potential item to be purchased: and (b) an inventory amount of the second physical potential item to be purchased.

8. The system of claim 1, wherein the second software element associated with the first client computer receives instructions from the central server comprising at least one instruction indicating the at least one first source from which the first software element associated with the first client computer is to obtain content; and wherein the fourth software element associated with the second client receives instructions from the central server comprising at least one instruction indicating the at least one second source from which the third software element associated with the second client computer is to obtain content.

9. A method performed in a computing system for exhibiting at least visual content in a physical retail store, comprising:

displaying in the physical retail store at least a first physical potential item to be purchased and a second physical potential item to be purchased;

locating at least a first client computer and a second client computer in the physical retail store, wherein the first client computer has installed thereon a first application and the second client computer has installed thereon a second application;

interacting, by the first client computer, with the first physical potential item, displayed in the physical retail store, to be purchased;

wherein the first physical potential item to be purchased comprises hardware and software that are necessary for the first client computer to interact with the first physical potential item to be purchased;

interacting, by the second client computer with the second physical potential item displayed in the physical retail store, to be purchased;

wherein the second physical potential item to be purchased comprises hardware and software that are necessary for the second client computer to interact with the second physical potential item to be purchased;

storing, in an item data structure associated with the central server, data relating to: (a) information of the first physical potential item to be purchased including a first specified physical retail store and specifications regarding the first physical potential item to be purchased; and (b) information of the second physical potential item to be purchased including a second specified physical retail store and specifications regarding the second physical potential item to be purchased;

receiving, by the first client computer, at least one first input from a first potential purchaser of the first physical potential item to be purchased, based, at least in part, on a first direct interaction of the first potential purchaser with at least one input device connected to the first client computer;

receiving, by the second client computer, at least one second input from a second potential purchaser of the second physical potential item to be purchased based, at least in part, on a second direct interaction of the second potential purchaser with at least one input device connected to the second client computer;

obtaining by a first software element of the first application of the first client computer, at least first visual content from at least one first source other than a central server;

receiving, by a second software element of the first application, from the central server on a periodic basis, instructions regarding the information of the first physical potential item to be purchased including the specifications regarding the first physical potential item;

exhibiting a first visual presentation, to first potential purchaser, by the first physical potential item to be purchased, based, at least in part, on: a) a location of the first physical potential item to be purchased, b) the specifications regarding the first physical potential item received from the first client computer, c) the at least one first input received from the first client computer;

obtaining by a third software element of the second application of the second client computer, at least second visual content from at least one second source other than the central server;

receiving by a fourth software element of the second application, from the central server on a periodic basis, instructions regarding the information of the second physical potential item to be purchased including the specifications regarding the second physical potential item; and exhibiting a second visual presentation, by the second physical potential item to be purchased, based, at least in part, on: a) a location of the second physical potential item to be purchased, b) the specifications regarding the second physical potential item received from the second client computer, c) the at least one second input received from the second client computer.

10. The method of claim 9, wherein the computing system includes one or more programmed computers.

11. The method of claim 9, wherein the computing system is distributed over a plurality of programmed computers.

12. The method of claim 9, wherein the steps are carried out in the order recited.

13. A programmed computer system for exhibiting at least visual content in a physical retail store, comprising:
    a central server comprising:
        a non-transient memory having at least one region for storing computer executable program code; and
        at least one processor for executing the program code stored in the memory;
    a first client computer that has installed thereon a first application, the first client computer comprising:
        a non-transient memory having at least one region for storing the first application; and
        at least one processor for executing the first application stored in the memory;
    a second client computer that has installed thereon a second application, the second client computer comprising:
        a non-transient memory having at least one region for storing the second application; and
        at least one processor for executing the second application stored in the memory;
    an item data structure associated with the central server, wherein the item database stores data relating to: (a) information of a first physical potential item to be purchased including a first specified physical retail store and specifications regarding the first physical potential item to be purchased; and (b) information of a second physical potential item to be purchased including a second specified physical retail store and specifications regarding the second physical potential item to be purchased;
    wherein the first client computer is located in the physical retail store;
    wherein the second client computer is located in the physical retail store;
    wherein the first client computer interacts with the first physical potential item, displayed in the physical retail store, to be purchased;
    wherein the first physical potential item to be purchased comprises hardware and software that are necessary for the first client computer to interact with the first physical potential item to be purchased;
    wherein the second client computer interacts with the second physical potential item, displayed in the physical retail store, to be purchased;
    wherein the second physical potential item to be purchased comprises hardware and software that are necessary for the second client computer to interact with the second physical potential item to be purchased;
    wherein the first client computer has at least one input device that is connected to the first client computer, wherein the input device connected to the first client computer is located in the physical retail store, and wherein the input device connected to the first client computer is configured to allow for direct interaction with a first potential purchaser of the first physical potential item and to receive at least one first input from the first potential purchaser;

wherein the second client computer has at least one input device that is connected to the second client computer, wherein the input device connected to the second client computer is located in the physical retail store, and wherein the input device connected to the second client computer is configured to allow for direct interaction with a second potential purchaser of the second physical potential item and to receive at least one second input from the second potential purchaser;

wherein the first application installed on the first client computer comprises:

i) a first software program that directly interacts with the input device connected to the first client computer; and ii) a second software program comprising:
   1. a first software element that obtains at least first visual content from at least one first source other than the central server; and
   2. a second software element that receives instructions from the central server on a periodic basis regarding the information of the first physical potential item to be purchased including the specifications regarding the first physical potential item;

wherein the first physical potential item to be purchased exhibits a first visual presentation based at least in part on: a) a location of the first physical potential item to be purchased, b) the specifications regarding the first physical potential item received from the first client computer, and c) the at least one first input received from the first client computer; and wherein the second application installed on the second client computer comprises:

i) a third software program that directly interacts with the input device connected to the second client computer; and ii) a fourth software program comprising:
   1. a third software element that obtains at least second visual content from at least one second source other than the central server; and
   2. a fourth software element that receives instructions from the central server on a periodic basis regarding the information of the second physical potential item to be purchased including the specifications regarding the second physical potential item; and wherein the second physical potential item to be purchased exhibits a second visual presentation based at least in part on: a) a location of the second physical potential item to be purchased, b) the specifications regarding the second physical potential item, and c) the at least one second input received from the second client computer.

14. The programmed computer system of claim 13, wherein the programmed computer includes one or more processors.

15. The programmed computer system of claim 13, wherein the programmed computer is distributed over several physical locations.

* * * * *

UNITED STATES PATENT AND TRADEMARK OFFICE
CERTIFICATE OF CORRECTION

PATENT NO. : 8,635,116 B2  
APPLICATION NO. : 13/612324  
DATED : January 21, 2014  
INVENTOR(S) : Gilbert Fiorentino Page 1 of 1

It is certified that error appears in the above-identified patent and that said Letters Patent is hereby corrected as shown below:

In the Specification

Figure 7A:
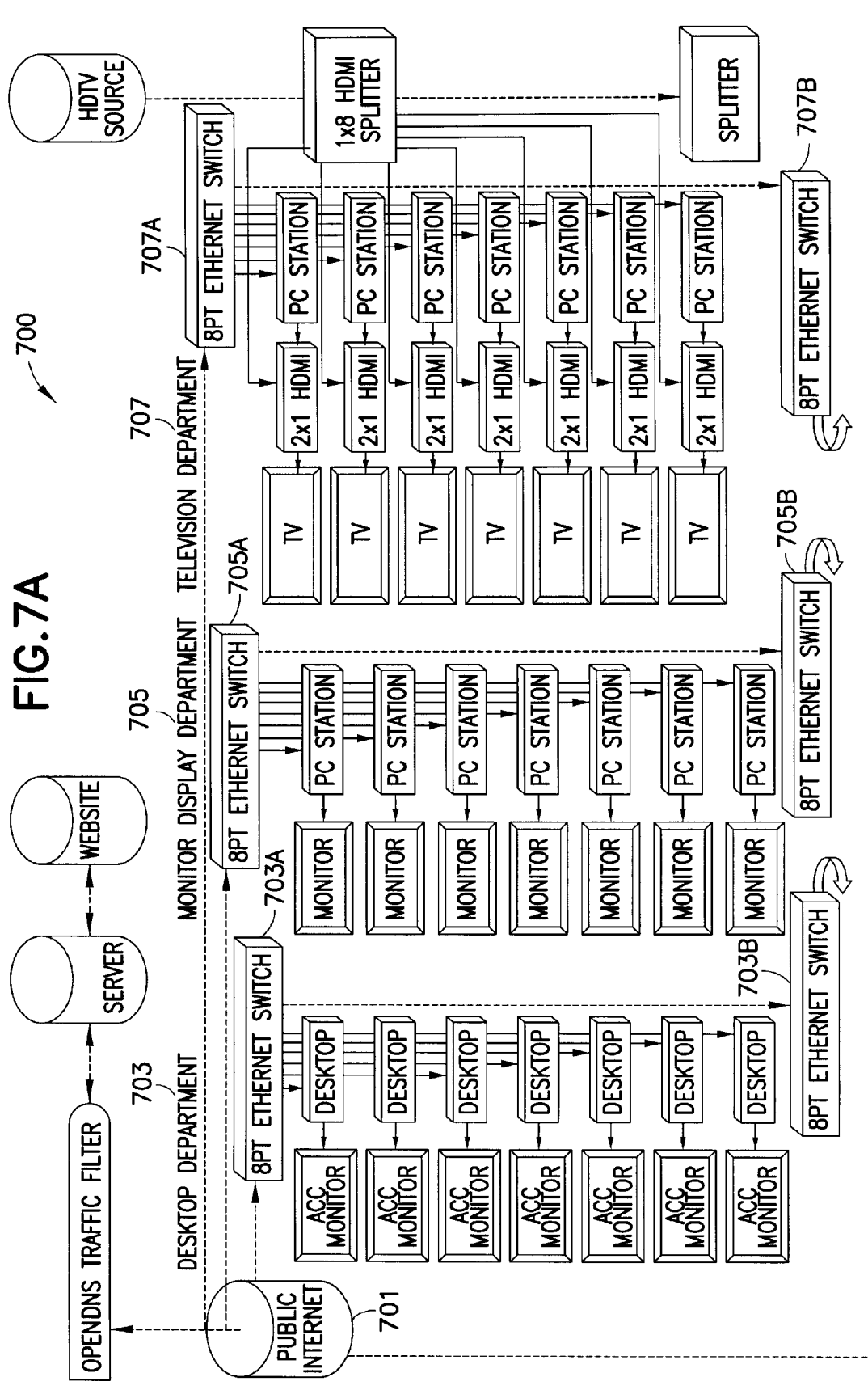
FIG. 7 shows a block diagram (a detailed interconnect diagram) according to another embodiment of the present invention.

Col. 2, Ln. 30, Delete "FIG. 7 shows" and insert -- FIGS. 7A-7B show --.

Col. 17, Ln. 66, Delete "FIG.7, this Fig. shows" and insert -- FIGS. 7A-7B, these Figs. show --.

Signed and Sealed this  
First Day of July, 2014

Michelle K. Lee  
*Deputy Director of the United States Patent and Trademark Office*